(12) United States Patent
Carignan et al.

(10) Patent No.: US 8,806,368 B2
(45) Date of Patent: Aug. 12, 2014

(54) USER INTERFACE HAVING QUICK VIEWS AND FULL VIEWS

(75) Inventors: Joelle Carignan, Mountain View, CA (US); Manik Singh, Berkeley, CA (US); Benjamin Tornsky, San Mateo, CA (US)

(73) Assignee: SAP AG, Walldorf (DE)

( * ) Notice: Subject to any disclaimer, the term of this patent is extended or adjusted under 35 U.S.C. 154(b) by 1492 days.

(21) Appl. No.: 11/238,978

(22) Filed: Sep. 30, 2005

(65) Prior Publication Data

US 2007/0079247 A1 Apr. 5, 2007

(51) Int. Cl.
G06F 9/00 (2006.01)
(52) U.S. Cl.
USPC ............ 715/804; 715/742; 715/747; 715/792
(58) Field of Classification Search
CPC ..................... G06F 17/30867; G06F 17/30657
USPC .................. 715/517, 804, 742, 745, 747, 792
See application file for complete search history.

(56) References Cited

U.S. PATENT DOCUMENTS

| | | | |
|---|---|---|---|
| 5,844,554 A | 12/1998 | Geller et al. | |
| 6,051,029 A | 4/2000 | Paterson et al. | |
| 6,118,451 A | 9/2000 | Alexander | |
| 6,735,569 B1 * | 5/2004 | Wizig | 705/4 |
| 6,950,990 B2 * | 9/2005 | Rajarajan et al. | 715/736 |
| 7,000,187 B2 * | 2/2006 | Messinger et al. | 715/705 |
| 2002/0054141 A1 * | 5/2002 | Yen et al. | 345/804 |
| 2002/0070961 A1 * | 6/2002 | Xu et al. | 345/738 |
| 2002/0163535 A1 | 11/2002 | Mitchell et al. | |
| 2002/0166118 A1 * | 11/2002 | Kovan et al. | 725/1 |
| 2004/0001103 A1 * | 1/2004 | Fliess et al. | 345/810 |
| 2004/0002887 A1 * | 1/2004 | Fliess et al. | 705/9 |
| 2004/0220825 A1 * | 11/2004 | Schwerin-Wenzel et al. | 705/1 |
| 2005/0235224 A1 * | 10/2005 | Arend et al. | 715/792 |
| 2006/0095276 A1 * | 5/2006 | Axelrod et al. | 705/1 |
| 2006/0111953 A1 * | 5/2006 | Setya | 705/8 |

FOREIGN PATENT DOCUMENTS

| | | |
|---|---|---|
| EP | 0 706 124 A1 | 4/1996 |
| EP | 1 098 244 A2 | 5/2001 |
| EP | 1 098 244 A3 | 5/2001 |
| WO | WO 2004/019160 A2 | 3/2004 |
| WO | WO 2004/019160 A3 | 3/2004 |

OTHER PUBLICATIONS

European Search Report for European Application No. 05007683.5-2211; European Patent Office; Dated May 7, 2006; (4 pages).
Anonymous: "Lotus Notes 6.51 Screen shots"; Dec. 17, 2003; IBM Corp.; Armonk, XP002385427; the whole document.

* cited by examiner

*Primary Examiner* — Daeho Song
(74) *Attorney, Agent, or Firm* — Finnegan, Henderson, Farabow, Garrett & Dunner, LLP

(57) ABSTRACT

A quick-view user interface for assisting a user in performing a task and shielding the user from complex data. The quick-view user interface may include a window on a computer screen. The window may comprise a pane for displaying a subset of data, based on the user's role, from a set of data displayed on a full-view user interface. In addition, the full-view user interface may assist a user in performing a task by allowing the user to view the set of data. The full-view user interface may include a window on a computer screen comprising a first pane for displaying a set of data and a link engageable to open a second pane for displaying a subset of the set of data, the subset being selected based on the user's role.

20 Claims, 28 Drawing Sheets

Fig. 1

| ACME COMPANY DATA | | | |
|---|---|---|---|
| View △ Data △ | | | |
| Save View Print Email Excel Filter Sort App | | | |
| STATES | SALES | INVENTORY | EMPLOYEES |
| ALABAMA | 179 | 233 | 3457 |
| ALASKA | 329 | 124 | 1278 |
| . . . . . | . . . . . | . . . . . | . . . . . |
| WYOMING | 245 | 872 | 678 |

FIG. 6

| SALES | | | | |
|---|---|---|---|---|
| ALABAMA | ALASKA | ..... | WYOMING |
| 170 | 300 | ..... | 240 |

PURCHASE ORDER

SAP NETWEAVER - MICROSOFT INTERNET EXPLORER PROVIDED BY SAP IT

NUMBER: 4390001412  NAME: MATERIAL PLAN 100315
SUPPLIER: PLASTOCO GMBH  STATUS: OPEN
HERE APPEARS EXPLAINING TEXT

| ORDER NAME | MATERIAL PLAN 100315 |
| ORDER NUMBER | 4390001412 |
| TRANSACTION TYPE | ECA4 |
| CREATED | 20.08.2003 |
| LAST MODIFIED | 20.08.2003 |
| LAST MODIFIED BY | PETER WEBB |
| STATUS | ORDERED |
| TOTAL VALUE | 382.305,84 EUR |

| NET VALUE | 329.574,00 EUR |
| TAX VALUE | 52.731,84 EUR |
| SUPPLIER* | PLASTOCO GMBH |
| REQUESTER* | FRANK SANDERS |
| PURCHASING ORGANISATION | EEP_PO_LOCAL |
| PURCHASING GROUP | AAP_PG_LOC1 |
| COST CENTER* | AC PRODUCTION |

[ORDER] [HOLD] [CHECK]

VIEW
SELECTION
QUICK VIEW
FACTSHEET>>
MAIN
PRINT PREVIEW
NOTES & ATTACHMENTS
PAYMENTS
APPROVAL
BUDGET
YOU CAN ALSO
SEND PO IMMEDIATELY
CREATE BID INVITATION
CREATE AUCTION
SOURCE ITEMS
RELATED DOCUMENTS
REQUEST
RECEIPT
INVOICE
LOOK UP
[        ] [SEARCH]

FIG. 22a

USER INTERFACE HAVING QUICK VIEWS AND FULL VIEWS

RELATED APPLICATIONS

This application is related to four other applications. These applications are "User Interface for an Activity Scout Window," Ser. No. 10/825,561, "System And Method For Progressively Disclosing Information to a Computer User," Ser. No. 10/825,564, "User Interface Adaptable by an End User," Ser. No. 10/825,559 "User Interface for a Guided Activity Window," Ser. No. 10/825,563, and "User Interface for an Object Instance Floorplan," Ser. No. 10/825,565.

TECHNICAL FIELD

This invention relates generally to computer system user interfaces, and more specifically to methods and systems for providing quick views of reporting content in different content types, such as a portal or transactions (e.g. a form) and full views for handling reporting tasks in business applications.

BACKGROUND

In today's business environment, employees often must resort to many sources of information and means of communication to effectively perform tasks as part of their responsibilities. Increasingly, those tasks require receiving, locating, editing, or creating information using computer programs.

One group of programs helps to create or maintain knowledge or content management. These programs may include software for email, word processing, accounting, presentation, and scheduling, such as Microsoft Outlook, Word, PowerPoint, Excel, Lotus Notes, Lotus Organizer, and Adobe Acrobat. Typically, these programs are based on a user's personal computer or a local server. They often result in "loose" files that are personal to the individual who creates them.

Certain business roles also require accessing or manipulating data stored in large databases, such as enterprise solution software. These enterprise packages provide a single entry point to information, applications, and services that people need to do their jobs according to their role in the organization. They provide a way for suppliers, customers, partners, and employees to access all relevant content easily and securely and to participate in all types of business processes. Since information and applications are unified, users can identify and address business issues faster, more effectively, and at a lower cost. Specific enterprise solutions may exist for assisting the company with enterprise resource planning, customer resource management, human resource management, and supply chain management.

Given the large amount of information that must be handled by these applications, a user is often presented with a report containing a massive amount of information. Often, a user is required to review information that is not relevant to the completion of a task. Having to review this irrelevant information is a waste of an organization's resources. Prior art systems do not allow a user to view the most relevant information needed to complete an operational task and to also have access to the full amount of information available without querying a report. The present invention is directed to overcoming one or more of these deficiencies.

SUMMARY

A quick-view user interface is provided. The quick-view user interface may comprise a window on a computer screen of a user. The quick-view user interface may further comprise a pane within the window for displaying, based on a role of the user, a subset of data drawn from a set of data.

A full-view user interface is provided. The full-view user interface may comprise a window on a computer screen of a user. The full-view user interface may further comprise a pane within the window for displaying a set of data and a first link within the window engageable to open a second pane for displaying a subset of the set of data, the subset selected based on a role of the user.

A method of providing a quick-view user interface is provided. The method may comprise providing a window having a pane to a user. The method may further comprise selecting a subset from a set of data based on a role of the user and displaying the subset of the set of data in the pane.

A method of providing a full-view user interface is provided. The method may comprise providing a window to a user. The method may further comprise displaying a first pane showing a set of data in the window. The method may also comprise displaying a link engageable to open a second pane for displaying a subset of the set of data, the subset selected based on a role of the user.

A computer-readable medium comprising instructions is provided. The execution of the instructions may cause a computer to provide a quick-view user interface. The quick-view user interface may comprise a window on a computer screen of a user. The quick-view user interface may further comprise a pane within the window for displaying, based on a role of the user, a subset of data drawn from a set of data.

A computer-readable medium comprising instructions is provided. The execution of the instructions may cause a computer to provide a full-view user interface. The full-view user interface may comprise a window on a computer screen of a user. The full-view user interface may further comprise a pane within the window for displaying a set of data. The full-view user interface may also comprise a first link within the window engageable to open a second pane for displaying a subset of the set of data, the subset selected based on a role of the user.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the principles of the present invention and together with the corresponding written description, help explain principles associated with the invention. In the drawings:

FIG. 1 is a functional diagram of a quick-view report within a Windows operating environment.

FIG. 6 is an exemplary full-view report.

FIG. 7 discloses an exemplary quick-view report of the sales data obtained from a full-view report, in a table format.

FIG. 17b is the screen shot of step three after the user has selected from a pop-up menu.

DETAILED DESCRIPTION

Figure 2:
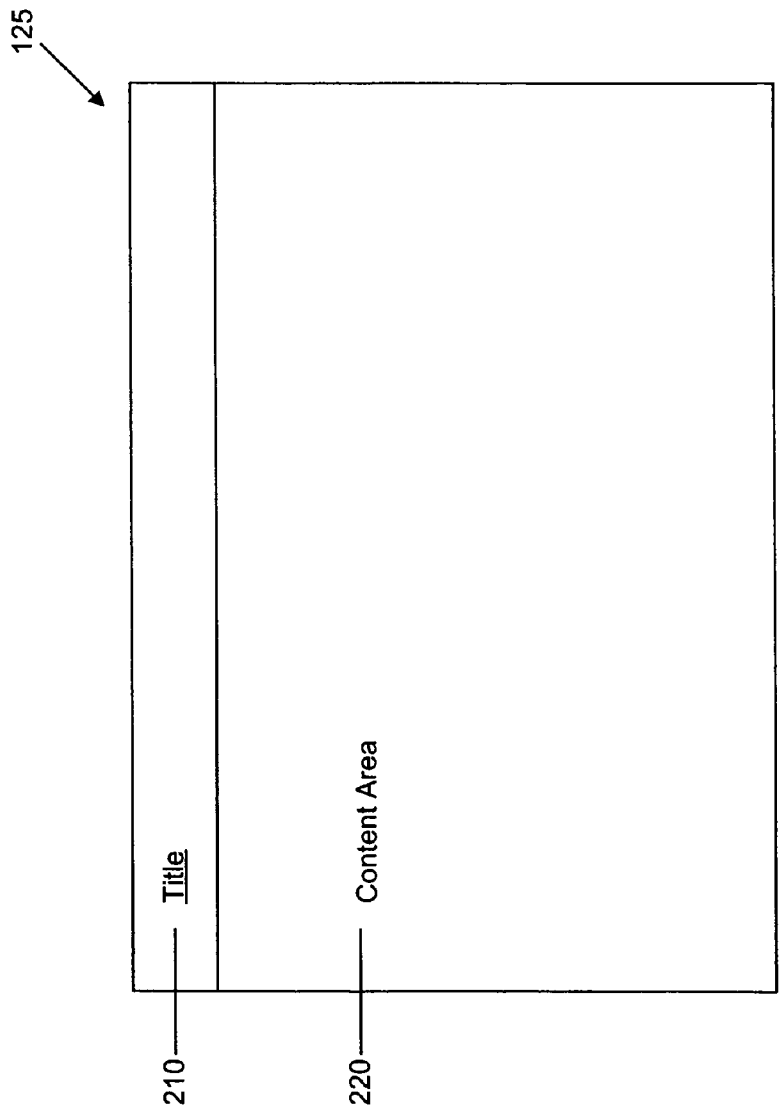
FIG. 2 is an exemplary structure of a quick-view report.

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles.

As embodied herein, a user interface having incremental or progressive disclosure of information provides an efficient vehicle for guiding a computer user through large quantities of data. Conventional user interfaces, particularly for enterprise solutions, force a user to sort through large amounts of data in a computer system. Given the complexity of data and files for a large enterprise or business function, finding or editing the desired information can be a daunting task. The present user interface, however, presents, selected information to the user. Accordingly, a user interface consistent with the principles of the present invention provides information to the user based on the user's role within an organization. A user's role can be determined by the user or by another individual, such as a system administrator. A user may determine what content within a quick-view report he wishes to see and hide. In addition, an administrator could determine what content within a quick-view report is displayed to a particular user, or a class of users. Furthermore, a user could determine what quick-view reports are available to a user or class of users. An administrator could also determine what quick-view reports are available to a particular user or a class of users. As a result, the user's work may be simplified, allowing the user to spend more time using the computer system to monitor a business situation and less time entering data or attempting to retrieve information needed to make decisions.

Generally, a user's role refers to his position or responsibilities. For example, a person in the role of a sales manager for a manufacturing company may have the responsibility of monitoring sales that have occurred within a region. Tasks affiliated with that role may include reviewing sales receipts from purchasers, comparing past sales data with current data, and reviewing the sales data to determine the most successful product in each region. The information presented to the sales manager to accomplish these tasks via the present user interface may include, for example, a summary of the data on the status of existing sales. Other users with common roles may perform similar tasks and may have a customized user interface similar to the sales manager's. A user interface consistent with the present invention may take many forms and may be operative to empower each user to complete the tasks required by his role in the organization in a streamlined fashion.

Moreover, user interfaces designed consistent with the present disclosure may be customized. While the user interface aims to protect the user from information extraneous to the task at hand, what comprises extraneous information depends at least on the user and his level of familiarity with the data and the system. As users become more proficient with the system, the present disclosure contemplates that users may reduce the level of guidance provided by the interface. Thus, user interfaces designed according to the teachings of the disclosure provide simple, low-level guidance to new users, allowing the user to tailor the system as his experience increases.

Figure 1:
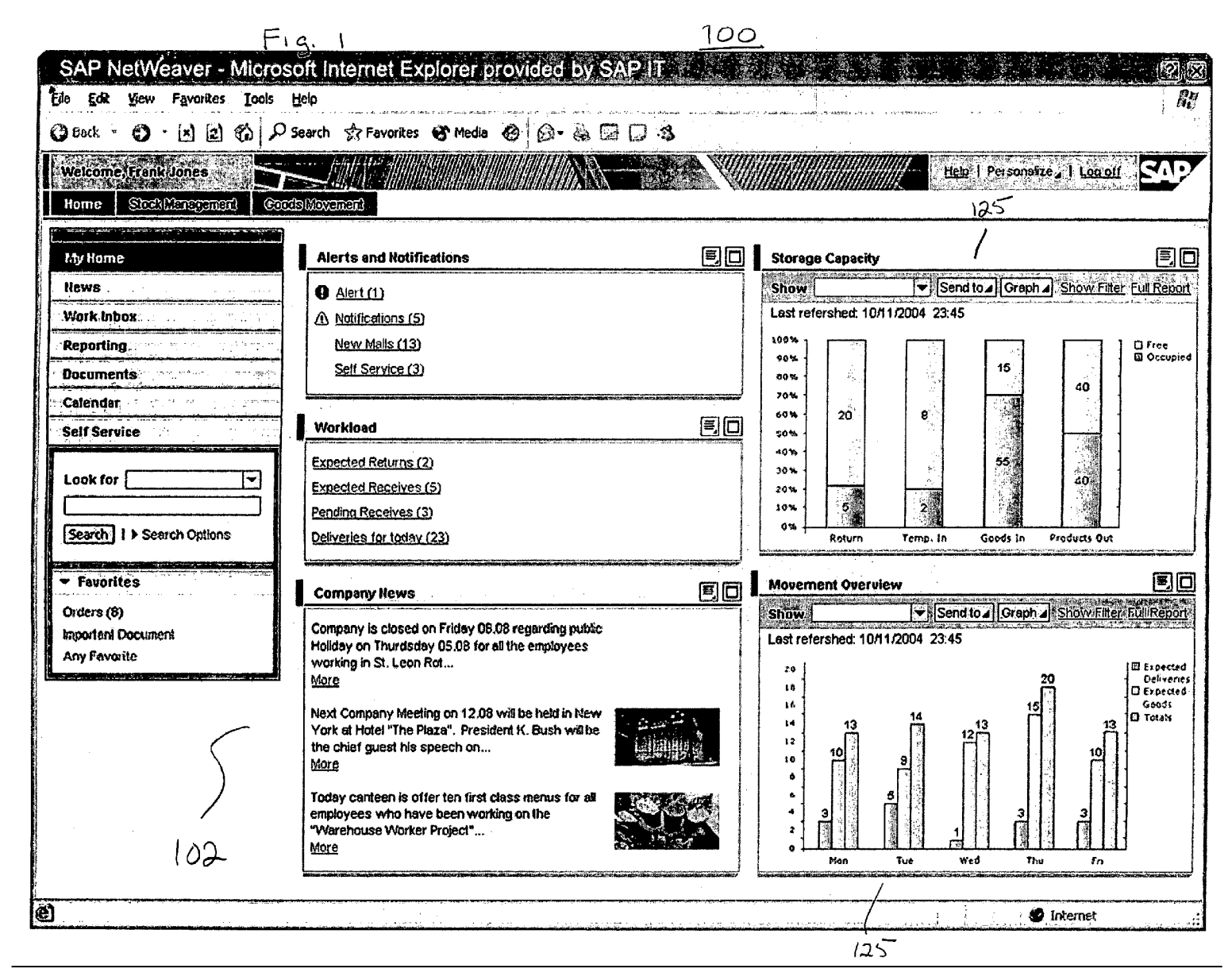

As embodied herein, a user interface consistent with the present teachings may access different resources of the computer system and provide a summary of the resources in order to assist the user in performing a task. FIG. 1 illustrates a functional diagram of a user interface from the perspective of the user.

This user interface will be described with respect to a Windows Longhorn desktop. This is purely for exemplary purposes, as the user interface may be implemented in any operating system that provides a graphical user interface, such as Windows XP, Unix, Linux, or Apple's OS X.

As shown in FIG. 1, the exemplary user interface may be a browser 100, and may include a side bar 102. Side bar 102 may be designated to comprise any number of features, including but not limited to a list of links, a search engine tool bar, a list of alerts and notifications, a workload summary and/or a company news section. In addition, sidebar 102 may have a pluggable feature, so that applications may utilize sidebar 102. Features displayed in browser 100 may be specifically tailored to individual users. For example, a user having the role of a sales manager may receive alerts and notifications warning the manager of changes to outstanding sales data.

The user interface may also include icons for launching a quick-view report 125. Quick-view reports 125 may comprise small, streamlined reports used to reduce the need to view all the data contained within a full-view report and also to present the most relevant information within a full-view report to users as soon as possible. A full-view report, which is discussed in detail below, may comprise a larger report containing a large amount of data that has not been streamlined for a particular user based on the user's role within a company.

FIG. 2 illustrates an exemplary structure of a quick-view report 125. The quick-view report 125 may comprise one or more of the following building blocks, or components: (i) a title bar 210; and (ii) a content area 220. The title bar provides information on the nature of the quick-view report 125 or other descriptive information concerning the report. In addition, the title bar 210 may include a link to a full-view report setting forth a more detailed description of the relevant tasks or data. The content area 220 may display content data, such as a table and/or a graphical view of the streamlined data. This table and graph can take many forms, such as a pie chart, bar chart, line chart, Gantt chart, scatter diagram, Map(GIS), and waterfall chart. It is recognized that although a title bar 210 is useful to inform users of the information provided by a particular quick-view report 125, the title bar 210 may be omitted consistent with the principles of the present invention.

Figure 3:
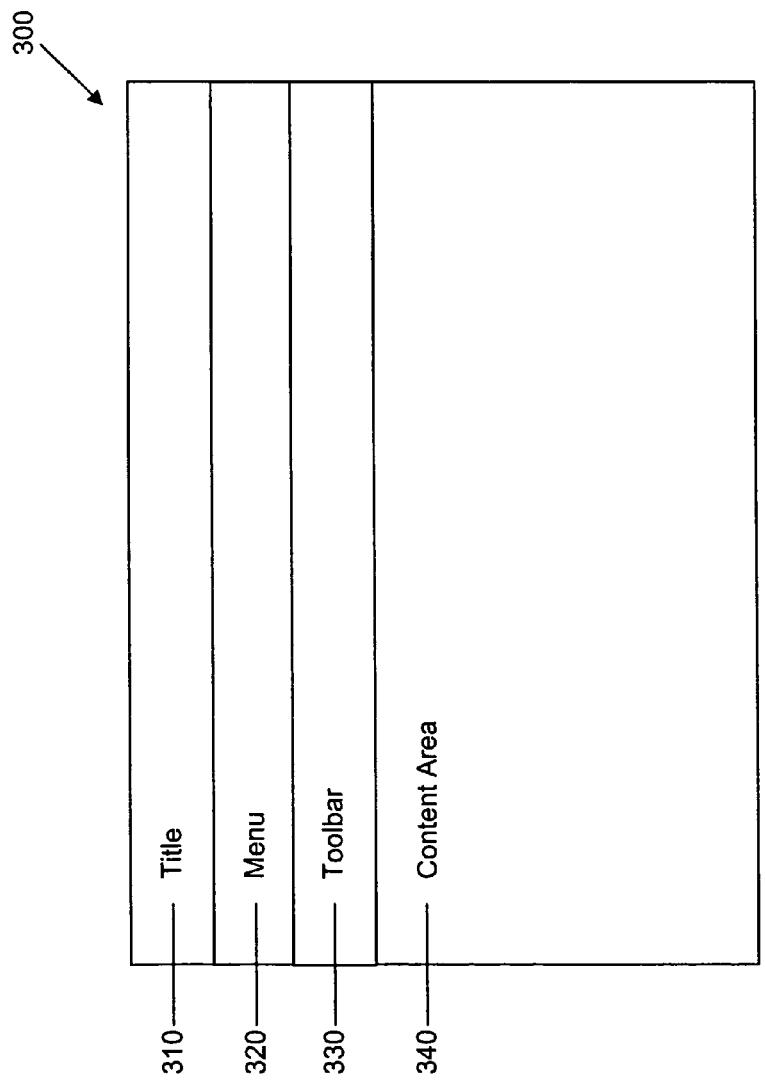
FIG. 3 is an exemplary structure of a full-view report.

FIG. 3 illustrates an exemplary structure of a full-view report 300. The full-view report 300 may comprise one or more of the following building blocks, or components: a title bar 310; a menu bar 320; a toolbar 330; and a content area bar 340. The title bar 310 may display relevant information such as the name of the report or other descriptive information. The menu bar 320, if present, may be used to provide a drop-down menu of functions that are capable of, for example, changing the layout of the data in the report, changing the format of the data, such as color of the text and background colors, the ability to insert notations into data cells within the report, the ability to perform calculations on the data, the ability to export data from files, the ability to import data to files, and the ability to send data to other locations and users. The toolbar 330 may provide the user with the ability to change the way data is displayed, and the ability to filter and sort the data. The content area bar 340 displays the various views that are available, such as the table view and/or graphical view.

Figure 4:
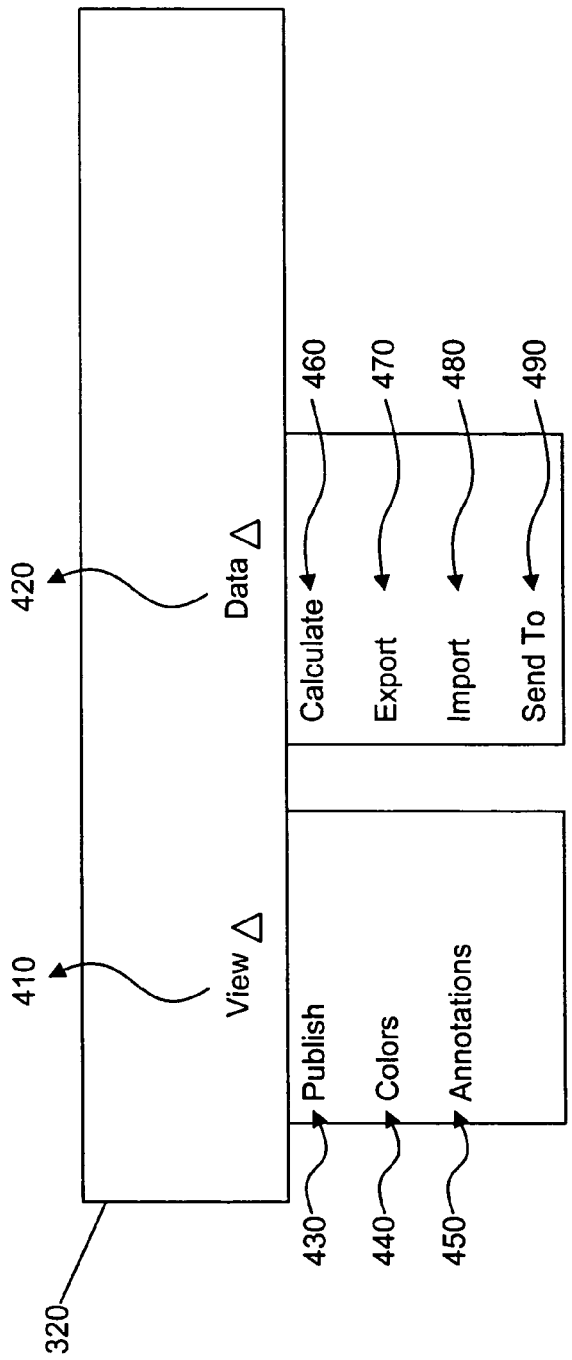
FIG. 4 is an exemplary detailed view of the menu bar of a full-view report.

FIG. 4 sets forth an exemplary detailed view of the menu bar 320. The menu bar 320 displayed in FIG. 4 may contain two different menus: View menu 410 and Data menu 420. The View menu 410 may be used to modify how the data is displayed. There may be various menu items under the View menu 410 which can be implemented by the user to alter the way data is displayed, such as the Publish menu item 430, Colors menu item 440, and Annotations menu item 450.

The Publish menu item 430 may enable users to modify the layout of the full-view report 300. By using the Publish menu item 430, a user is able to allow other users on the system to view the layout of the full-view report 300 that has been created. The Color menu item 440 allows the user to modify the color of the text and background within a data cell. The Annotations menu item 450 may enable the user to insert annotations into data cells.

The Data menu 420 may be used to perform calculations on the data, import data, export data, and send data. There are various menu items under the Data menu 420 which can be used by the user to manipulate the data, such as the Calculate menu item 460, the Export menu item 470, the Import menu item 480, and the Send To menu item 490.

The Calculate menu item 460 contains data analysis functions that may enable the user to perform calculations on the data, such as subtotals, totals, averages, and various types of data analyses. The Export menu item 470 can allow the user to export data to another file format, such as Excel, Access, Text, Adobe Acrobat, Word, Html and Xml. The Import menu item 480 may allow the user to import data into the full-view report 300 from other file formats, such as Excel and Word. The Send To menu item 490 can allow users to send data to other users through email, assign the full-view report 300 to other users based on their role, assign it to another user's work list, and publish it on the Internet or Intranet.

In other versions consistent with the principles of the present invention, menu bar 320 need not be provided. However, even in such versions, the features described above with regard to menu bar 320 may be provided in other manners. For example, the features may be provided in toolbar 330 or sidebar 102. Alternatively, the features may be provided in a context menu (not pictured) that may be opened, for example, by right-clicking on data to be analyzed or exported. It is recognized that these alternatives to menu bar 320 are not limiting, and that any combination of the above-described techniques and other techniques known in the art may be utilized to provide a user access to various features of the user interface.

Figure 5A:
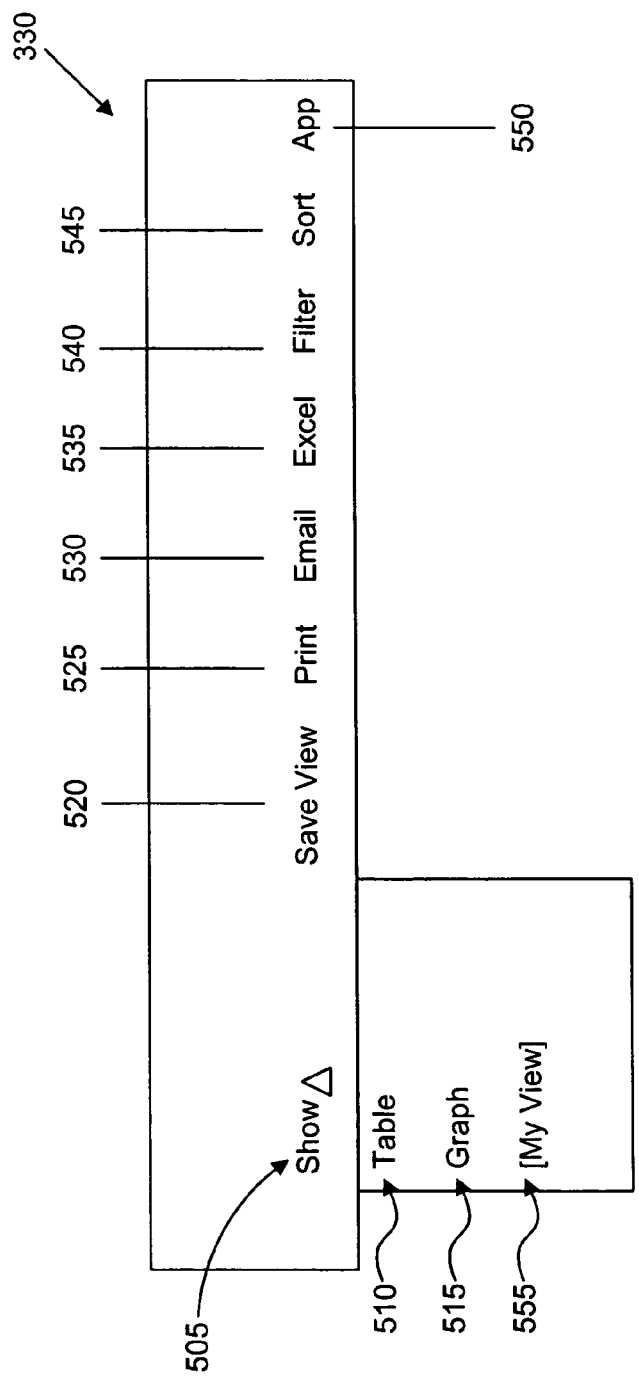
FIG. 5A is an exemplary detailed view of the toolbar of a full-view report.

FIG. 5A sets forth an exemplary detailed view of the toolbar 330. The toolbar 330 may comprise various menus, including the Show menu 505, Save View menu 520, Print menu 525, Email menu 530, Excel menu 535, Filter menu 540, Sort menu 545, and App menu 550. Various menu items illustrated under the Show menu 505 may be used to alter the way data is displayed, such as the Table menu item 510, the Graph menu item 515 and the My View item 555.

The Show menu 505 may be used to select the layout that the user wishes to view, such as a table view or a graphical view. The menu items below the Show menu 505 may offer users the ability select the Table menu item 510 or the Graph menu item 515. The selection of Table menu item 510 may result in the data being displayed in a table format, allowing the user to examine all of the information in each data cell. The Graph menu item 515 may allow the user to display data in a graph format. Graphs may be provided in numerous formats, including but not limited to line graphs, bar graphs or pie charts. The My View item 555 may enable a user to recall a previously created view. Therefore, a user can reacquire a previously created layout.

The Save View menu item 520 may allow a user to save the view that they have created. When the user enters the fill-view report 300, the default view may be displayed. Once a user makes a modification to the full-view report, the Save View menu item 520 may become active. When the user selects the Save View button, a pop-up menu, displayed in FIG. 5B, may appear.

Figure 5B:
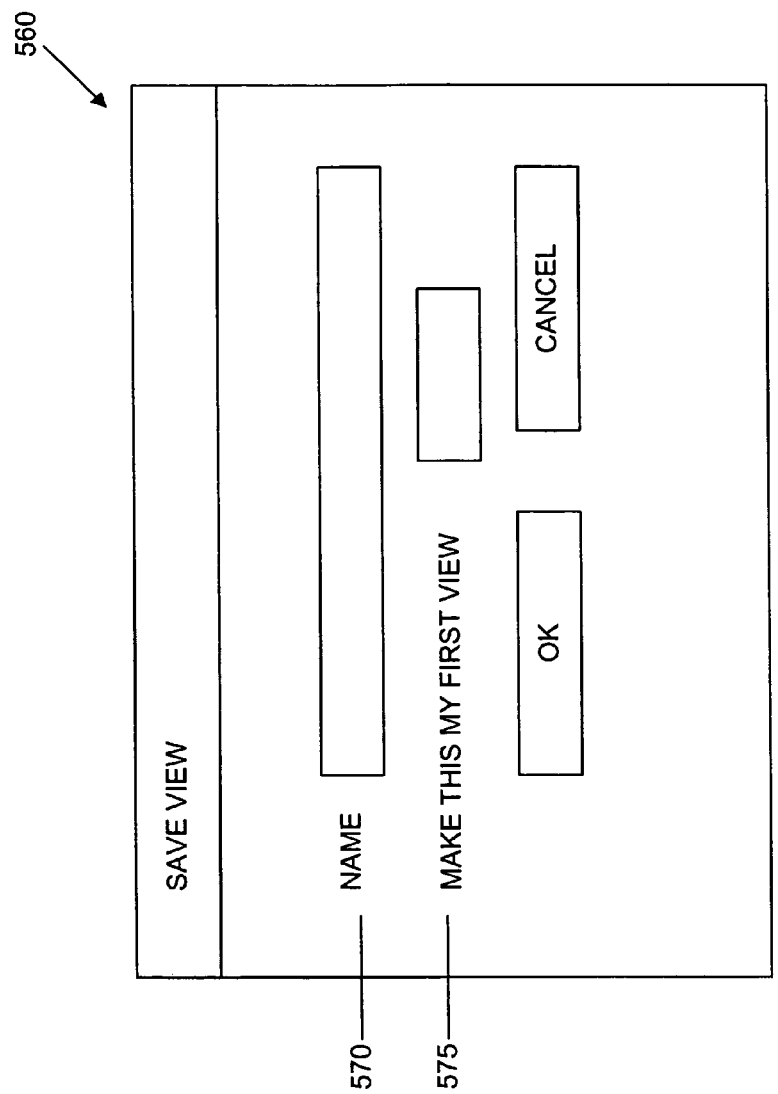
FIG. 5B is an exemplary pop-up menu used by the Save View menu item of the toolbar of a full-view report.

FIG. 5B sets forth an example of a pop-up menu used by the Save View menu item 520. The Save View menu pop-up 560 may allow a user to utilize a name field 570, in order to assign a name to the customized view. In addition, a user may select the Name View Select field 575 in order to make this the default view that appears to the user when opening a fill-view report 300. In addition, once the user has selected a view and named it, the view may appear as a menu item under the Show menu 505 in FIG. 5A. My View menu item 555 may be operative to represent a customized view created by the user.

Print menu item 525, in FIG. 5A, may enable the user to print the full-view report 300. Email menu 530 may enable the user to email the report to another user. The Excel menu 535 may enable the user to convert the data in the full-view report 300 into an Excel file. It is recognized that alternative spreadsheet programs may also be used. Filter menu item 540 may enable a user to filter the data within a full-view report 300 based on various criteria. Sort menu item 540 may enable a user to sort the data. In one exemplary implementation, the selection of the Sort menu item 545 may result in a pop-up menu, which is displayed in FIG. 5C.

Figure 5C:
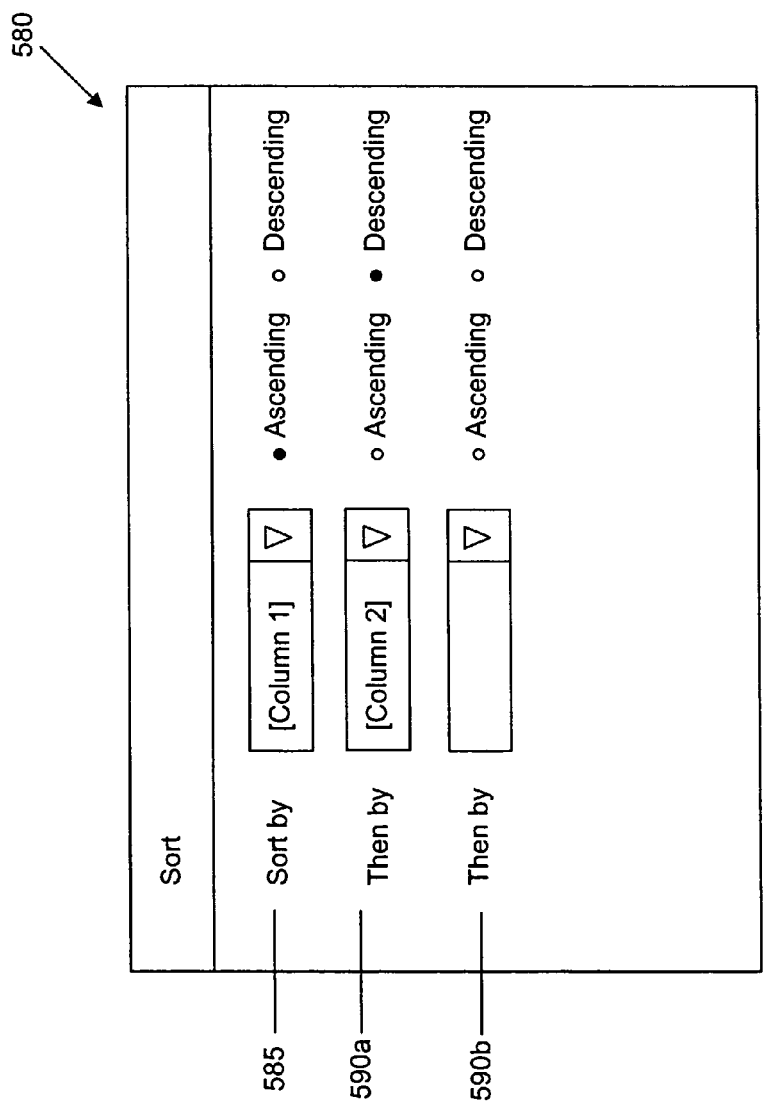
FIG. 5C is an exemplary pop-up menu accessed via the Sort menu item of the toolbar of a full-view report.

The Sort menu pop-up 580 may assist the user in sorting data. Sort by field 585 may enable the user to select how data will be sorted. For example, as illustrated in FIG. 5C, the Sort by field 585 may enable the user to sort data based on the column number in either ascending or descending order. Next, the Then by fields 590a and 590b may enable the user to include additional columns for sorting. For example, as illustrated in FIG. 5C, the user may sort Column 1 of data in ascending order and Column 2 of data in descending order.

Toolbar 330 may also comprise the App menu item 550. This menu item may be used for a variety of applications. For example, this menu item may serve to lock the document in its current location in memory. In addition, additional App menu items 550 may be added to the toolbar 330 to incorporate additional functions.

Like menu bar 320, it is recognized that in certain versions consistent with the principles of the present invention, toolbar 330 need not be provided. However, even in such versions, any of the functions described above with regard to toolbar 330 may be provided in another manner, such as through menu bar 320 or a context menu.

FIG. 6 sets forth an exemplary full-view report 600. This full-view report is an example of Acme Company's data concerning its product line. The title bar 605 contains a description of the full-view report 600, in this example ACME COMPANY DATA. The menu bar 610 may contain both the View menu 615 and Data menu 620 discussed earlier. The toolbar menu 625 may contain the Show menu 630, Save menu item 635, Print menu item 640, Email menu item 645, Excel menu item 650, filter menu item 655, Sort menu item 660, and App menu item 665. The content area 670 may contain various headers setting forth relevant data for the Acme Company. The content area 670 may set forth a list of States in which Acme Company operates. In addition, the content area 670 may contain information concerning the sales, inventory, and number of employees that Acme Company has in every State. This full-view report 600 may be very helpful for the CEO of the company to get an overall view of how the company is doing. However, for other member of management within the company, much of this information might be irrelevant. For example, the Sales manager of the company may only be interested in the dollar amount in sales that have occurred in every State. In such an instance, the quick-view report 700 disclosed in FIG. 7 may be more useful.

Figure 7:
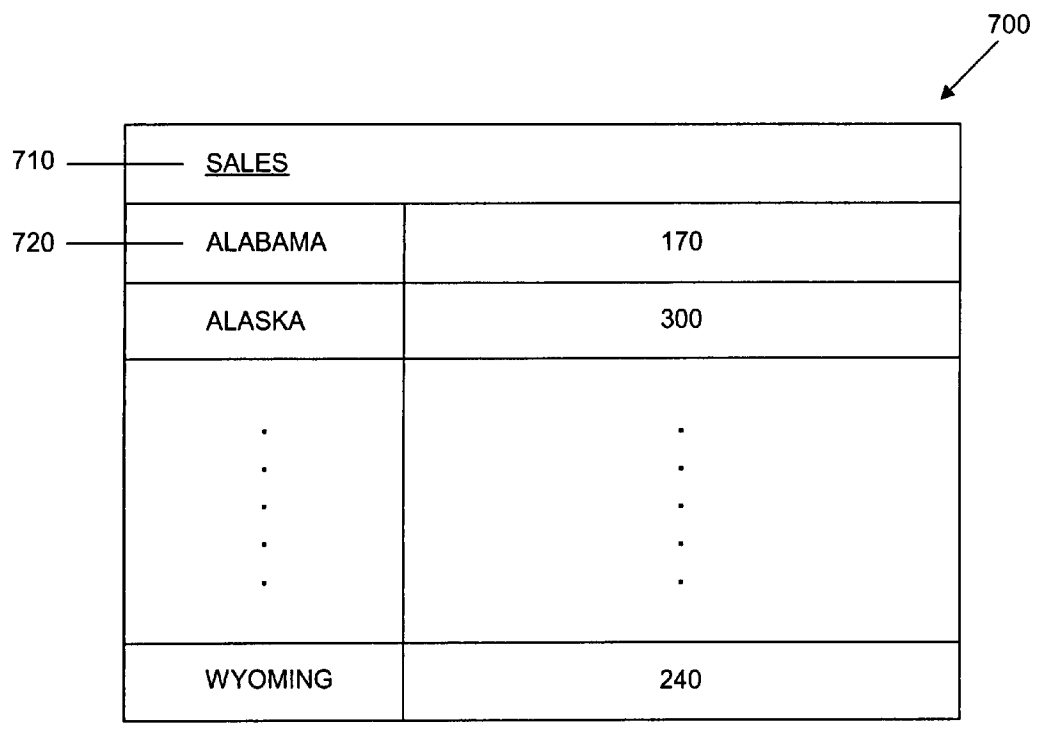

FIG. 7 discloses an exemplary quick-view report of the sales data obtained from a full-view report. The title bar 710 may contain a descriptive title that refers to the subject matter of the quick-view report 700. In this instance, since the Sales manager is the user, the quick-view report relating to sales is displayed. In one exemplary embodiment, the Sales manager's local or network profile may allow the user interface to recognize that the manager's primary area of interest is sales. Therefore, once the Sales manager accesses an icon referencing Acme Company's reports, the quick-view report 700 may appear, instead of the full-view report 600. However, if the Sales manager wanted to access the full report, a link may be provided to open the full-view report 600. In one implementation, for example, a link may be provided on the title bar 710 that the user may engage to open a window containing the full-view report 600.

The content area 720 of the quick-view report 700 may display all the data concerning sales within the displayed States. This may allow the manager to avoid having to review the entire full-view report 600 to obtain this information. As shown in FIG. 7, data in content area 720 may be displayed in table format.

Figure 8:
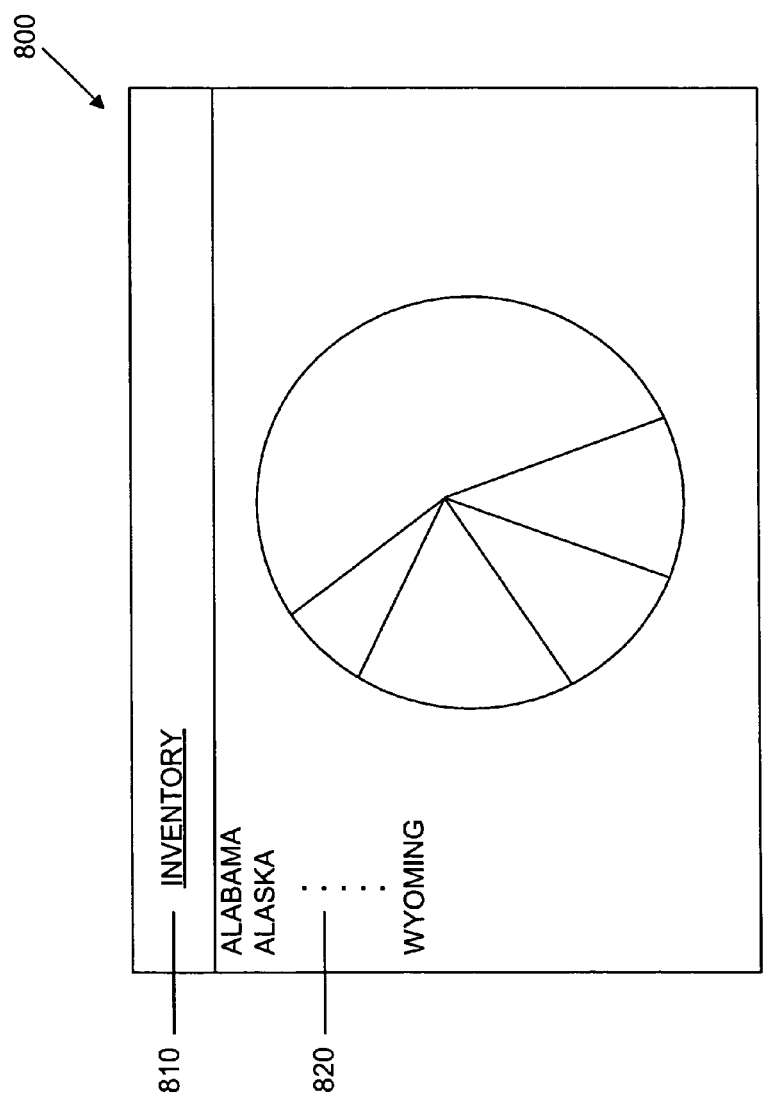
FIG. 8 displays an exemplary quick-view report concerning inventory, in a graph format.

FIG. 8 displays an exemplary quick-view report 800 concerning inventory. The title bar 810 may contain a descriptive title that refers to the subject matter of the quick-view report 800. In this instance, the Inventory manager is the user. Accordingly, the quick-view report 800 may disclose information relating to inventory. As in the example above, the local or network profile of the Inventory manager may indicate his primary area of interest, allowing the system to determine the data the quick-view report 800 should contain once the Inventory manager logs onto a computer with his profile. Therefore, once the Inventory manager accesses an icon referencing Acme Company's reports, the quick-view report 800 may appear, displaying information pertaining to inventory, instead of the full-view report 600. Once again, if the Inventory manager wanted to access the full report, he could engage a link operative to open the full-view report 600.

The content area 820 of the quick-view report 800 may display all the data concerning inventory within the displayed States concerning the Acme Company. This allows the manager to avoid having to review the entire full-view report 600 to obtain this information. The data in content area 820 is currently displayed in a pie-chart format.

Figure 9:
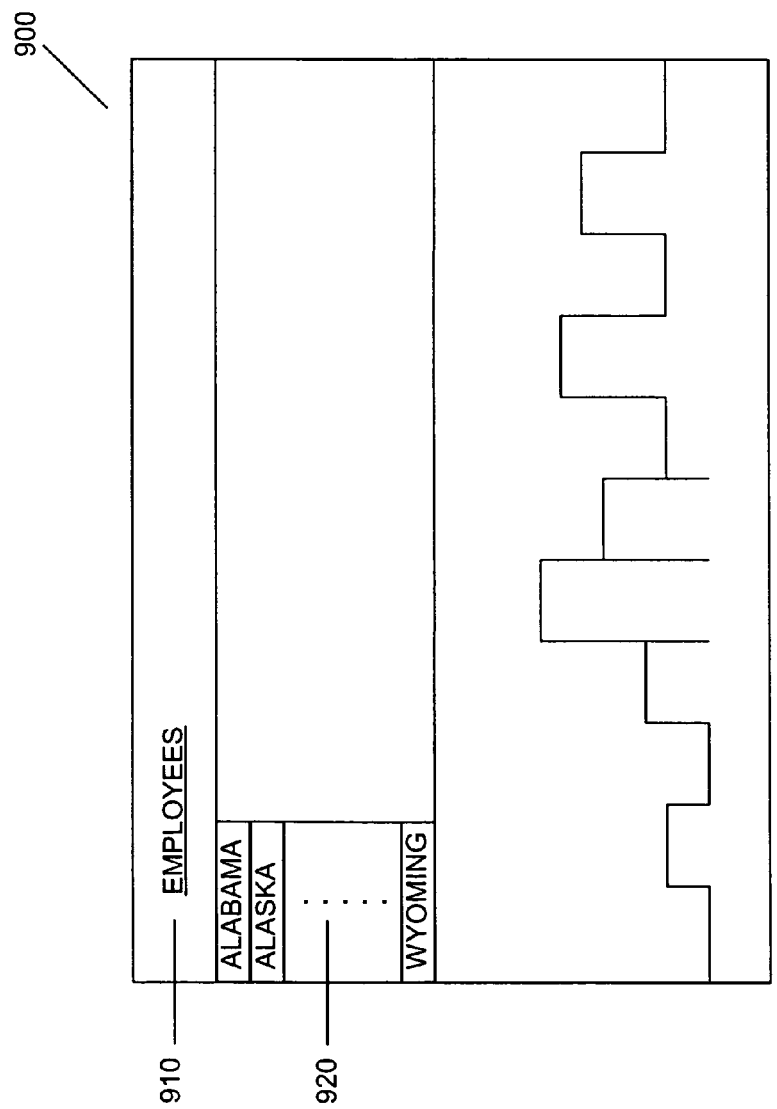
FIG. 9 displays an exemplary quick-view report concerning employees.

FIG. 9 displays an exemplary quick-view report 900 containing information pertaining to a company's employees. The title bar 910 contains a descriptive title that refers to the subject matter of the quick-view report 900. The quick-view report 900 may be displayed when the user is the company's Human Resources manager.

The content area 920 of the quick-view report 900 may display all the data concerning inventory within the displayed States concerning the Acme Company. This allows the manager to avoid having to review the entire full-view report 600 to obtain this information. As illustrated in FIG. 9, the data included in content area 920 may be displayed in both table and bar graph format.

The quick-view report may also interact with other interfaces, such as a quick activity window, guided activity floorplan, and a non-guided object instance floorplan. These interfaces were disclosed and claimed in the previously filed patent applications. These applications are "User Interface for an Activity Scout Window," Ser. No. 10/825,561, "System And Method For Progressively Disclosing Information to a Computer User," Ser. No. 10/825,564, "User Interface Adaptable by an End User," Ser. No. 10/825,559 "User Interface for a Guided Activity Window," Ser. No. 10/825,563, and "User Interface for an Object Instance Floorplan," Ser. No. 10/825,565.

Quick activity windows are small, streamlined applications that feature a user interface that provides the most frequently needed information to fulfill the desired task. Quick activities provide a minimal amount of information that is generally used to solve the majority of tasks that a user might want to undertake.

A quick activity window may provide the core functionality to accomplish the task at hand. The quick activity window may provide, for example: links to relevant information; links to activity scouts and guided activity windows; a basic content pane for entry and display of forms; and a core function pane allowing the user to take action on the quick activity, for example, saving, sending, accepting, or rejecting.

Figure 10:
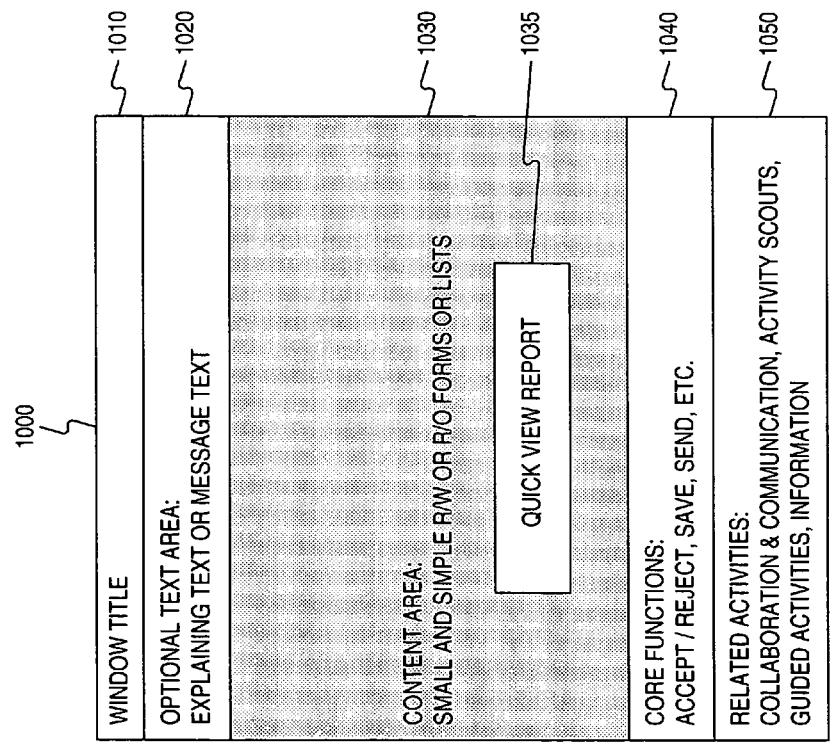
FIG. 10 illustrates an exemplary quick-activity floorplan for a quick-activity window.

A quick activity window may be constructed using a floorplan. A floorplan may comprise a window having generic patterns with respect to screen structure and semantics. FIG. 10 illustrates an exemplary quick activity floorplan 1000 for a quick activity window. The user interface shown as quick activity floorplan 1000 may provide a generic pattern with respect to screen structure and semantics and may be used to generate quick activity windows. The quick activity window, built from quick activity floorplan 1000, may provide the user with important views and actions associated with a business object. Thus, systems providers may build quick activity floorplans 1000 specifically for a given customer. The systems provider may use an analysis of a customer's metadata to determine the content of the plurality of quick activity floorplans 1000 to be constructed.

The quick activity floorplan 1000 may comprise one or more of the following building blocks or components: a window title 1010; a text pane 1020; a content pane 1030; a core function pane 1040; and a related activities pane 1050. Window title 1010 may provide information on the nature of the quick activity window. Text pane 1020 may provide messaging or explanatory text to assist the user in understanding the task that is to be resolved through the use of the quick activity window. Content pane 1030 may comprise small forms or lists. If a form is present in content pane 1030, the user may be able to complete the form or the form may be partially or completely pre-filled. Content pane 1030 may also present read-only lists. In addition, content pane 1030 may contain a quick-view report 1035. The quick-view report may be operative to present the most relevant information within a full-view report to a user.

Core functions pane 1040 may present the user with one or more choices of appropriate action given the content pane 1030. Core functions may include, for example, accept, reject, save, or send. The range of core functions is boundless given the range of data and forms that may be placed in content pane 1030. Related activities pane 1050 may include links to secondary activities related to the primary task of the quick activity window. Secondary activities may include, for example, links to activity scouts, guided activities, structured data, and unstructured data, such as scanned images and word processing documents. In addition, secondary activities may include links to communications and collaboration tools such as emails and Lotus Notes.

Figure 11:
FIG. 11 illustrates an example of a quick-activity window.

FIG. 11 illustrates an example of a quick activity window 1100. As shown in FIG. 11, the user's side bar may include an alert 1105 indicating that Plastico, a supplier, cannot deliver the requested quantity of goods. By activating alert 1105, possibly via a contextual menu, quick activity menu 1100 may be launched. The title 1110 of quick activity window 1100 alerting of Plastico's inability to deliver the goods may be, for example, "Alert from Plastico Inc." The text pane 1120 may consist of an email from Steve Ballard, a Production Specialist with Plastico, stating that Plastico will be unable to deliver more than 1100 tons of PPX that had previously been ordered. Because of the nature of the alert, quick activity window 1100 may be a change order quick activity window. Accordingly, the content pane 1130 may be opened as a change order form. Content pane 1130 shows header information at the top of the form and change order data at the bottom of the form. In the illustration, the form has already been completed to show a change in order quantity from 1200 tons to 400 tons. Thus, the user may be presented within content pane 1130 with most of the information that he needs to immediately act on the alert. The user may accept the data as pre-filled or may make changes. In addition, the quick-view report 1135 may provide the user with a quick summary of the inventory of PPX that it has at each of its locations in the United States. This may allow the user to determine if it is necessary to order the additional amount of PPX from another supplier or if the reduced amount is sufficient. In addition, the user may also click on a link within the quick-view report 1135 to access a full-view report containing more detailed information, such as the number of employees within each State. The quick-view report 1135, however, currently shields the user from having to view information that could be irrelevant based on the user's role within the organization.

Core function pane 1140 for quick activity window 1100 may comprise functions including but not limited to "Accept and Source Now," "Accept and Source Later," "Reject," and "Snooze." Once again, the content of core function pane 1140 may be driven by the content of content pane 1130. The user may dispatch with quick activity window 1100 and accept the change order by selecting the "Accept and Source Later" option in the core function pane 1140. Depending on how quick activity window 1100 is designed, "Accept and Source Now" may bring up another quick activity window for sourcing or may bring up a more complex guided activity window. Related activities pane 1150 may contain links to other quick activities, guided activities, or collaboration and correspondence functions. For example, the user may select the "Call Supplier" link to have his telephone dial Plastico.

Thus, most or all of the tools needed by the user to resolve this purchase order alert may be found within quick activity window 1100. In addition, the quick-view report 1135 may supply the appropriate information to the user and serve to shield the user form having to examine all the information contained within a full-view report. Those skilled in the art will appreciate that a great many quick activity windows may be designed for each role, and multiplied by the number of roles within an organization. A client-server system may provide hundreds or thousands of quick activity windows depending upon the number of roles within an organization. Each role may require, for example, ten to twenty quick activity windows. But the front-end expense of such an investment should be quickly recovered through the savings found in manpower and training costs with the present user interface.

Figure 12:
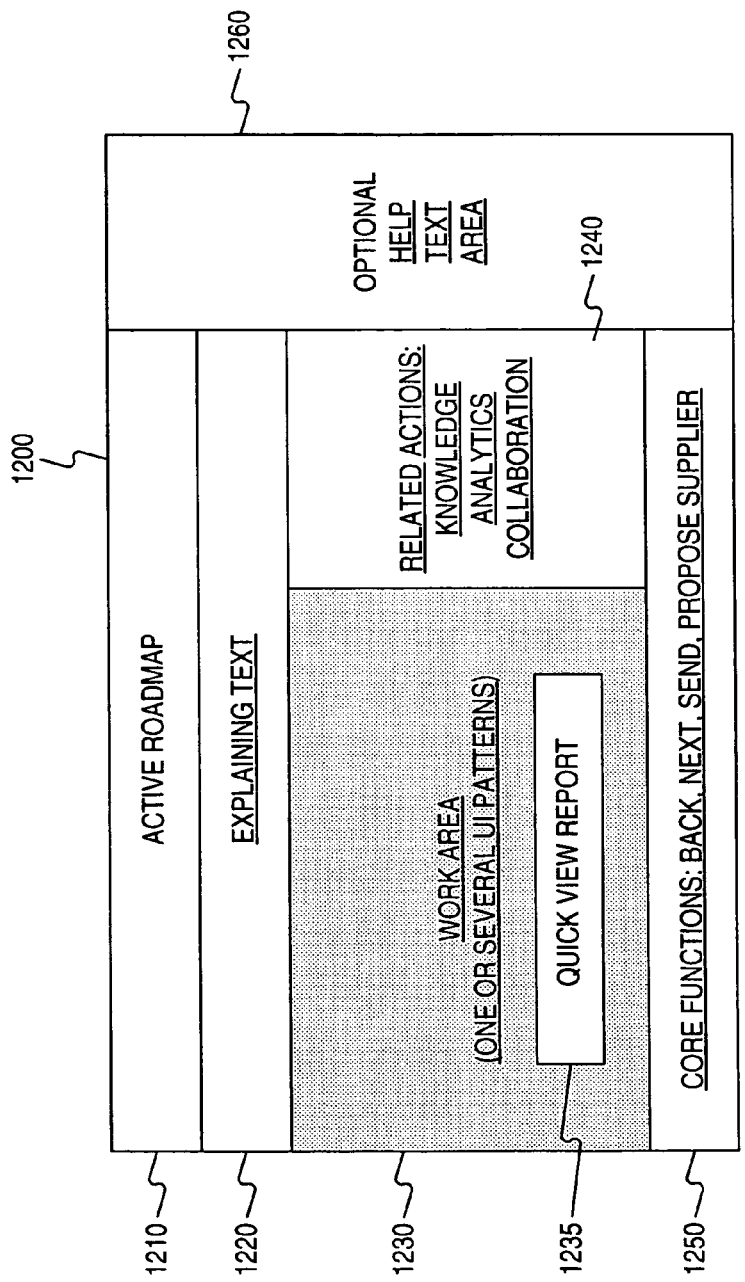
FIG. 12 illustrates an exemplary guided activity floorplan.

FIG. 12 illustrates an exemplary guided activity floorplan 1200. Guided activity floorplan 1200 may comprise one or more components, including but not limited to an active roadmap 1210, explanatory text 1220; work pane 1230; quick-view report 1235; related actions 1240; core functions 1250; and help pane 1260. Active roadmap 1210 may indicate to the user the sequence of steps that need to be accomplished to complete the task, guiding the user through the task. Active roadmap 1210 may be an active element on which the user may directly select a step and be taken to that screen; however, some steps may be dependent upon other steps being complete. The user may be permitted to minimize active roadmap 1210.

The content of the remainder of the components may vary depending on the step of the roadmap selected. For example, panes 1220-1260 may all or partially change based on the step of the sequence that is being performed by the user. As each step in the sequence is performed by the user, the relative locations of the text 1220, work pane 1230, quick-view report 1235, related actions 1240, and core functions 1250 may stay the same, while the content of those components changes. Thus, a stable pattern may be presented to the user as she steps through the sequence shown in active roadmap 1210.

Text 1220 displays basic instructional text for completing the current step of the sequence. For further information and help, the user may select to display a help pane 1260. Work pane 1230 displays a user interface pattern, or form, to the user for allowing completion of a step of the task. The user interface pattern may be drawn from a common pool of user interface patterns and plugged into work pane 1230. User interface patterns may include, for example, data entry forms or tables, analysis patterns, and comparison patterns. The user may also be able to personalize work pane 1230.

The quick-view report 1235, located within the work pane 1230, may provide a user with a quick summary of relevant data from a full report that might be useful in completion of a task.

Related actions 1240 may display one or more secondary, related tasks or activities that the user may wish to perform or consult in the course of engaging in the primary activity through the guided activity window. Selecting a link in related actions 1240 may bring forth, for example, a quick activity window or an activity scout.

As in the quick activity windows, core functions 1250 may provide a course of action that the user may select to progress through or complete the guided activity window task.

Figure 13:
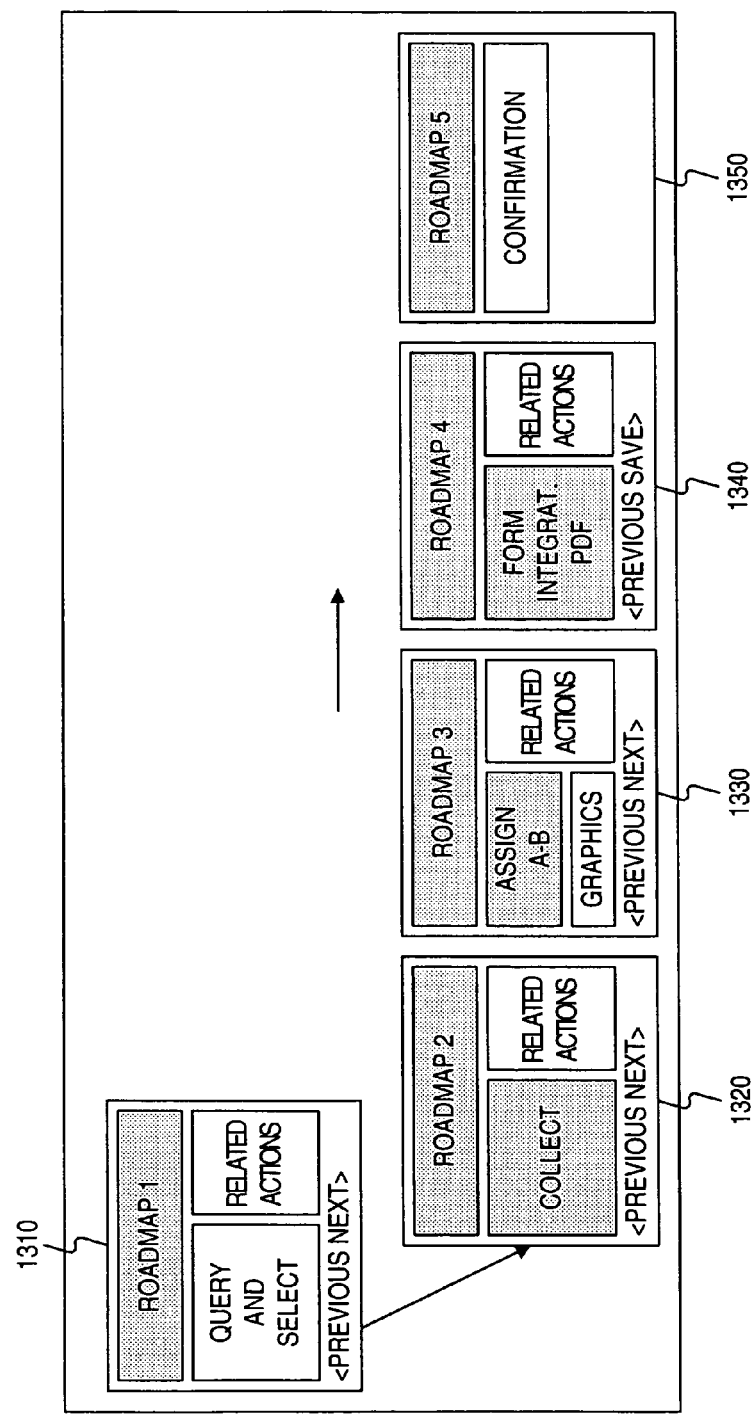
FIG. 13 illustrates an example of a plurality of guided activity floorplans.

FIG. 13 illustrates an example of a plurality of guided activity floorplans 1310-1350 showing the composition of the floorplans through a five-step guided activity sequence. The components of the floorplans may have a consistent look and placement across the sequence. While floorplans 1310-1350 may clearly show the work pane changing as the user steps through the sequence, the related actions are also likely changing as the user steps through the guided activity.

At step one of the sequence, guided activity floorplan 1310 may display an active roadmap, Roadmap 1, with step 1 highlighted in the five step sequence (shown later). The work pane of floorplan 1310 may display a query and select user interface pattern. The core function pane of floorplan 1310 may display two options, previous and next.

When the user goes to the Next Step, floorplan 1320 may be displayed. Like floorplan 1310, the active roadmap of floorplan 1320 may display that step 2 is engaged and the work pane of floorplan 1320 changes to a collection user interface pattern. Also, the core function pane of floorplan 1320 may display two options, previous and next.

Similar changes to the work pane take place in floorplans 1330 and 1340. The work pane in floorplan 1330 may display a combination of an assignment user interface pattern and a graphics user interface pattern. The work pane of floorplan 1340 may display a user interface pattern of an actual form that will be generated by this guided activity window.

Guided activities may be more fully understood through the following discussion regarding a user navigating through a guided activity window. In previous examples discussed above, a vendor was not able to supply all 1200 tons of PPX required by the purchasing agent. The vendor, Plastico, could only supply 400 tons. Due to the need for more detailed system data to meet his needs for raw materials, the purchasing agent may launch a sourcing guided activity window. In FIGS. 14-18, the purchasing agent may use the sourcing guided activity window to order some of the remaining 800 tons of PPX needed to compensate for Plastico's inability to delivery.

Figure 14:
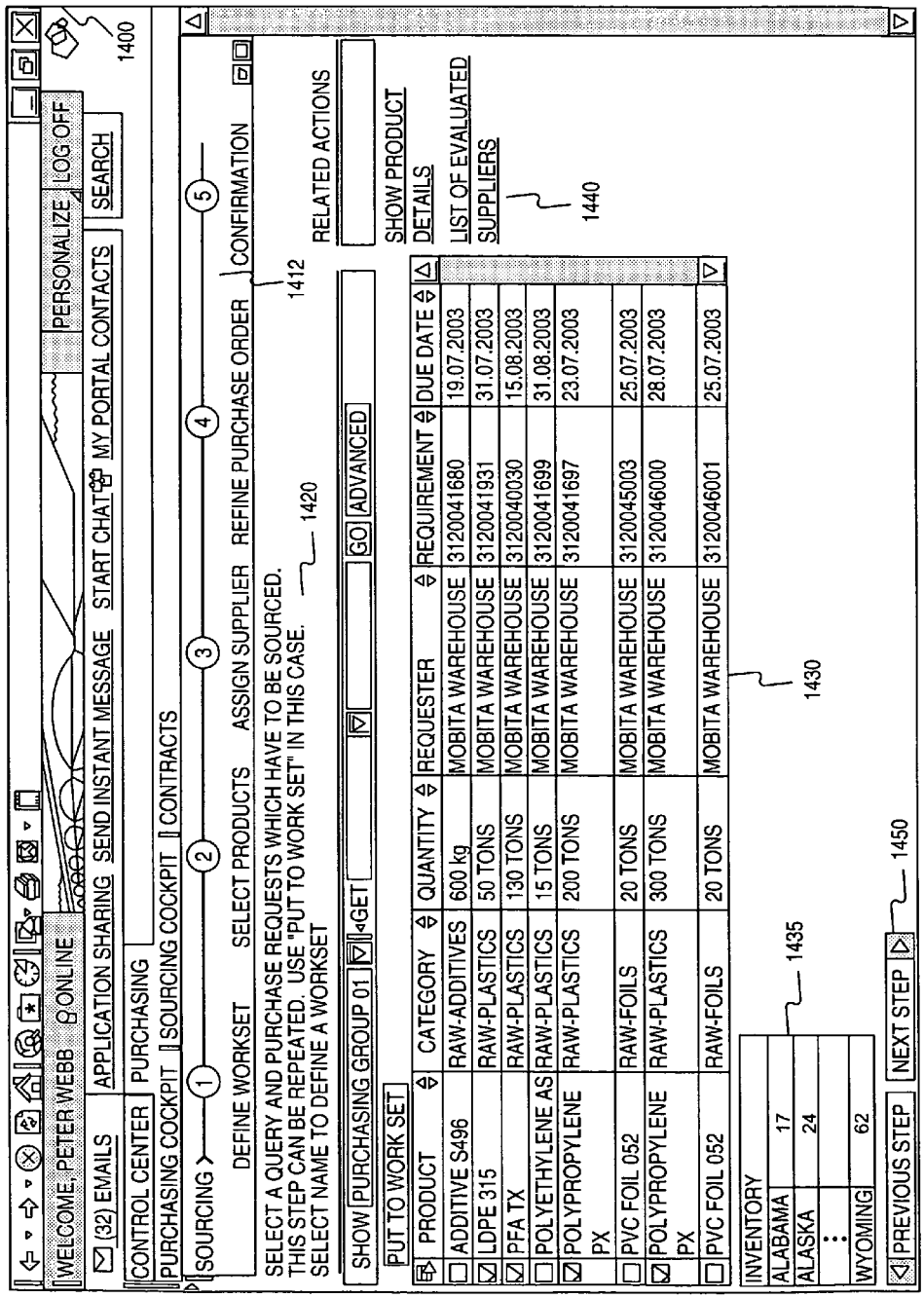
FIG. 14 illustrates an example of step one of a five-step sourcing guided activity window.

FIG. 14 illustrates an example of step one of a five-step sourcing guided activity window 1400. The purchasing agent may have launched the sourcing guided activity window from a quick activity window or an activity scout. The user interface may present the purchasing agent with an active roadmap 1410 near the top of the guided activity window. Active roadmap 1410 may include highlighting for step one in the guided activity, "Define Workset." Text pane 1420 may inform the user that he needs to select a query and purchase requests that need to be sourced. Work pane 1430 may display a query and select user interface pattern. Work pane 1430 may also contains quick-view report 1435 displaying a quick-view report setting forth the inventory of the selected products at each of the locations of the company throughout the United States. This may enable the user to examine a quick summary of the products without having to examine a full report containing a listing of information that would not be relevant for the current task. As illustrated in work pane 1430, the purchasing agent may select the PPX product, of which 300 tons need to be sourced for his company, called Mobita, by Jul. 28, 2003, and of which 200 tons need to be sourced by Jul. 23, 2003.

The user may also select two other products. These selections define the worksheet that the user will be using in the next step of the roadmap.

The user is also presented with related actions relevant to the current step in related actions pane 1440. As for core functions 1450 at the bottom of the user interface, the only function available to the user in this first step may be to proceed to "Next Step." When the user selects Next Step, he may be taken to the "Select Products" step shown in FIG. 15.

Figure 15:
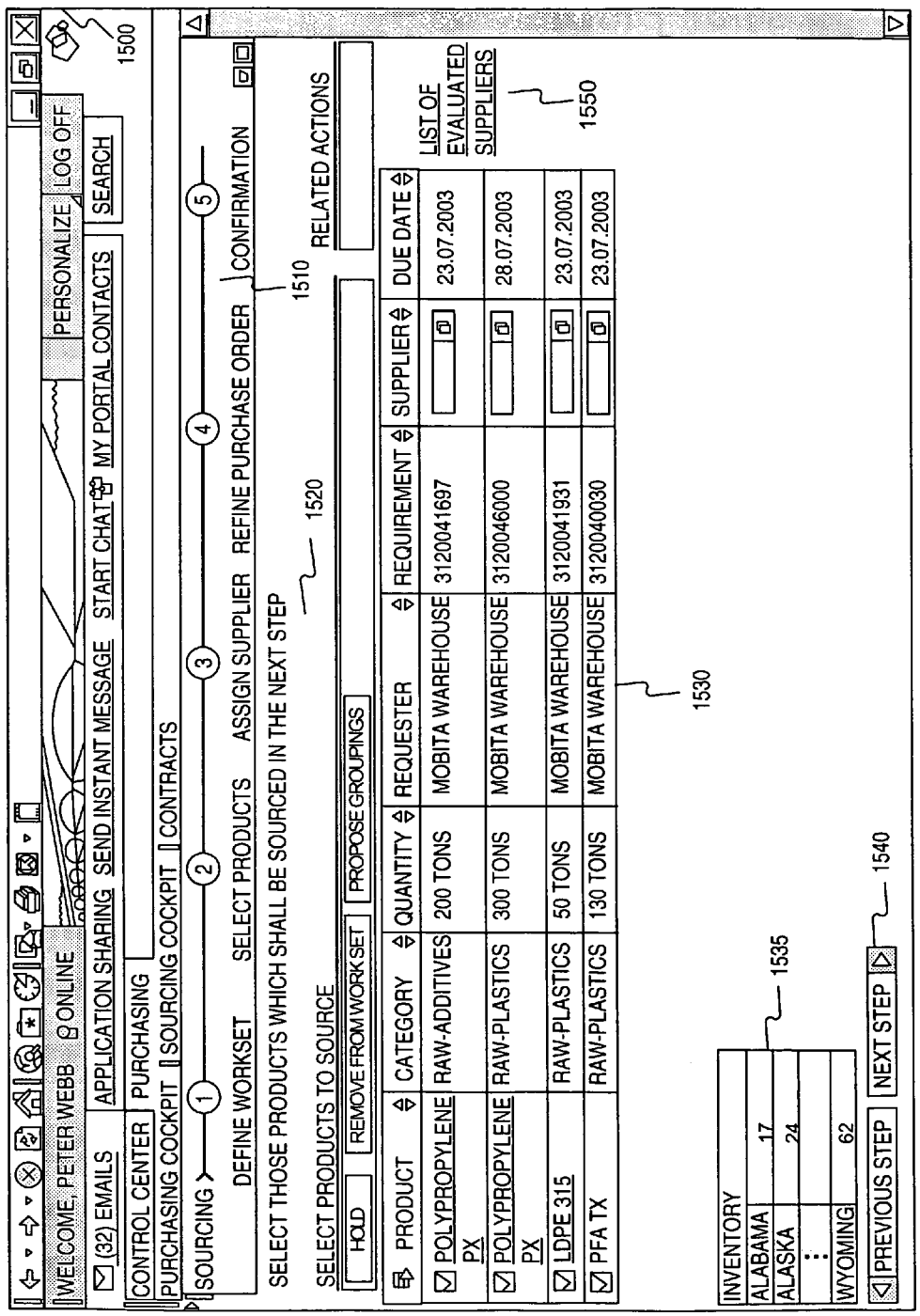
FIG. 15 illustrates an example of step two of a five-step sourcing guided activity window.

FIG. 15 illustrates an example of step two of a five-step sourcing guided activity window 1400. The user interface may present the user with active roadmap 1510 that shows the user that he is in step two, "Select Products," of the guided activity window. Text 1520 may instruct the user to select those products from the worksheet in the work pane 1530 that he would like to source. Work pane 1530 may also contain a quick-view report 1535 setting forth the inventory of the selected products at each of the locations of the company throughout the United States. This may enable the user to examine a quick summary of the products without having to examine a full report containing a listing of information that would not be relevant for the current task. As an aid, the user may select to view a list of evaluated suppliers through related actions 1550. In this example, the user has selected the two PPC products that need to be sourced.

Both core functions 1540 of "Previous Step" and "Next Step" may be available to the user in this second stage. When the user selects "Next Step," the user interface may proceed to the "Assign Supplier" step shown in FIG. 14.

Figure 16:
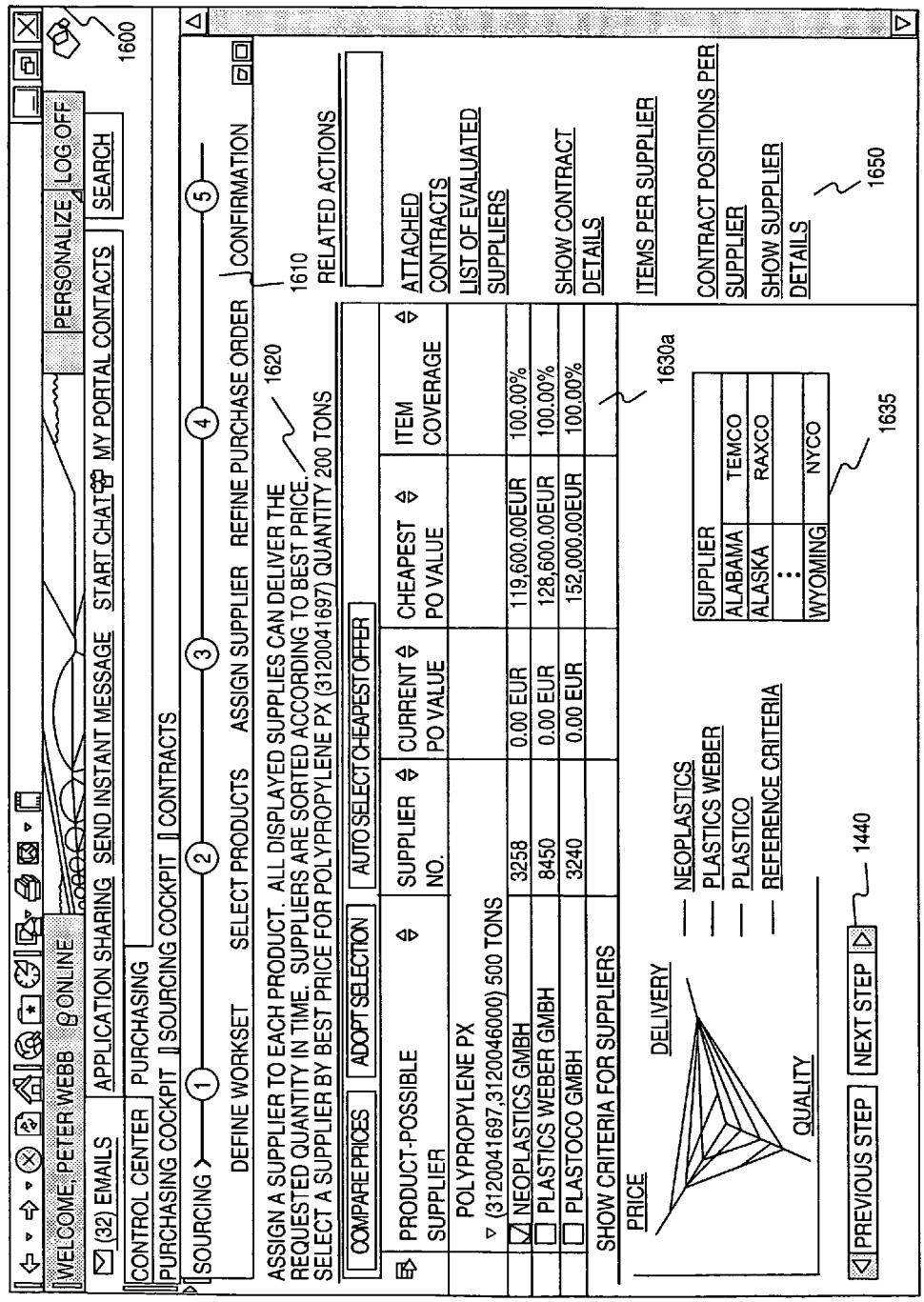
FIG. 16 illustrates an example of step three of a five-step sourcing guided activity window.

FIG. 16 illustrates an example of step three of a five-step sourcing guided activity window 1400. The user interface may present the user with active roadmap 1610 showing the user that he is in step three, "Assign Supplier," of the guided activity window. Text 1620 may instruct the user to assign a supplier to each product. Work panes 1630*a* and 1630*b* illustrate two user interface patterns for assisting in completing this step of the task. Work pane 1630*a* illustrates a user interface pattern with a form for the user to select a vendor. Work pane 1630*b* illustrates reporting and analytic information on past performance and current price of potential vendors. Thus, within works panes 1630*a* and 1630*b* the user may be provided with the tools to complete this step of the task and to assign a supplier to meet the raw material needs. Work panes 1630*a* and/or 1630*b* may also contain a quick-view report 1635 which display the most recent supplier used at each of the locations of the company throughout the United States. This may enable the user to examine a quick summary of the suppliers without having to examine a full report containing a listing of information that would not be relevant for the current task.

Figure 17A:
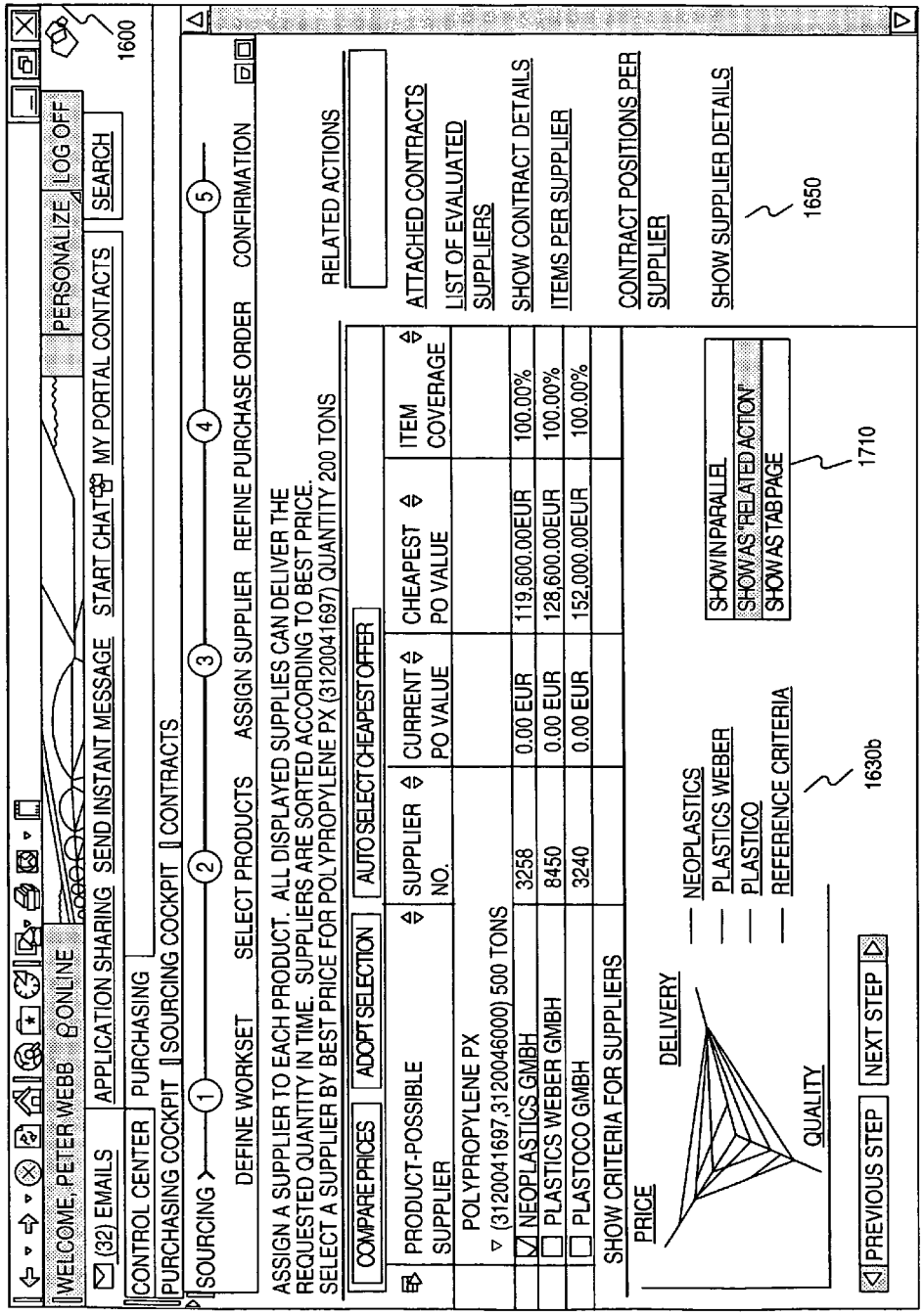
FIG. 17a shows a contextual pop-up menu that the user may engage.
Figure 17B:
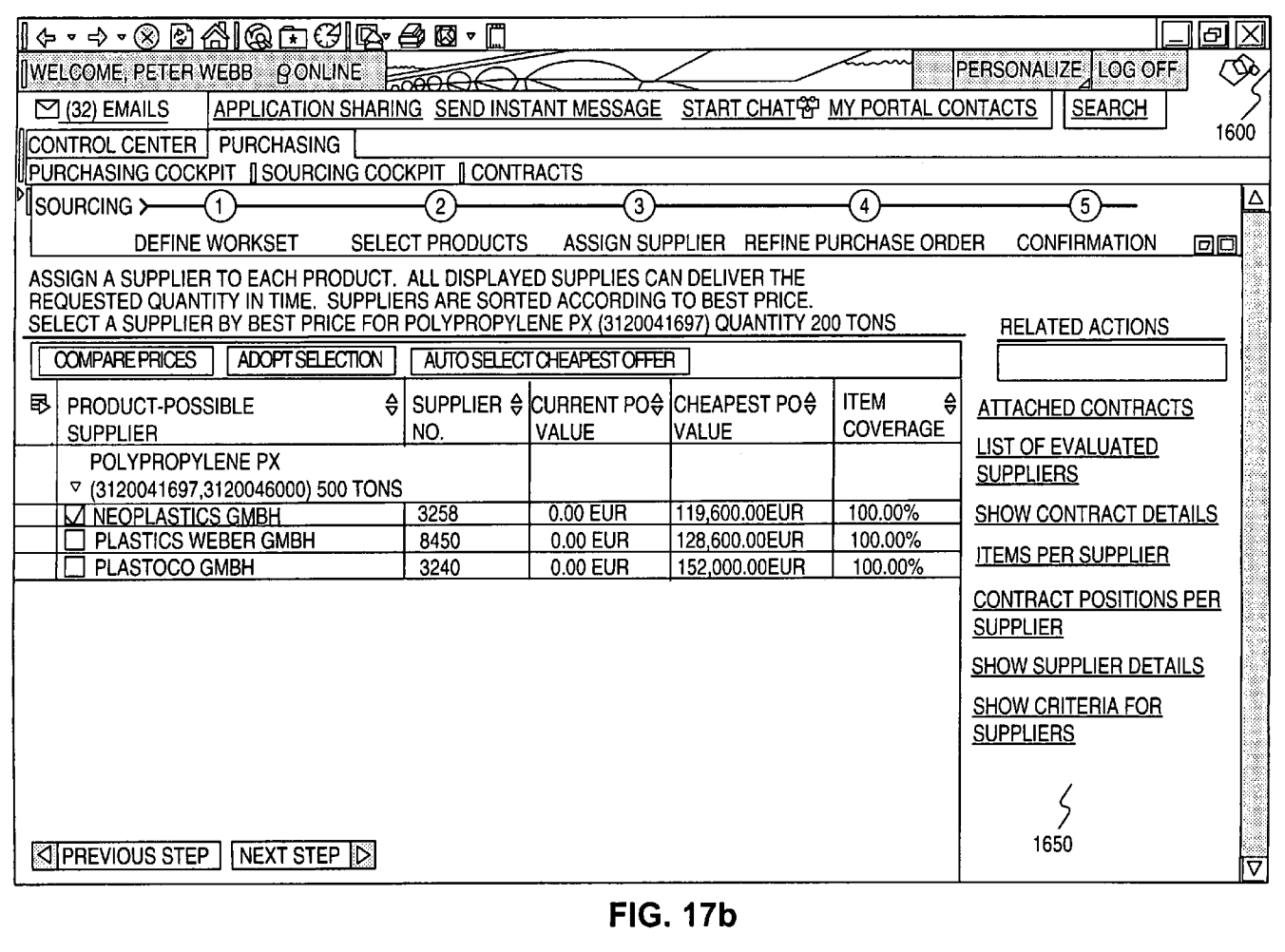

While FIG. 16 shows the default setting for work pane 1630*b*, like most aspects of the present disclosure, this user interface may be tailored by an end user. For example, FIG. 17*a* shows a contextual pop-up menu 1710 that the user may engage to eliminate the display of 1630*b* and reduce it to an additional listing in related actions 1650 or display the information in 1630*b* as a tabbed page. FIG. 17*b* is the screen shot of step three after the user has selected, from the contextual pop up menu, to "Show Criteria for Suppliers" as a related action.

Referring again to FIG. 16, the core functions 1640 of "Previous Step" and "Next Step" may be available to the user. When the user selects "Next Step," he may be taken to the "Refine Purchase Order" step shown in FIG. 18.

Figure 18:
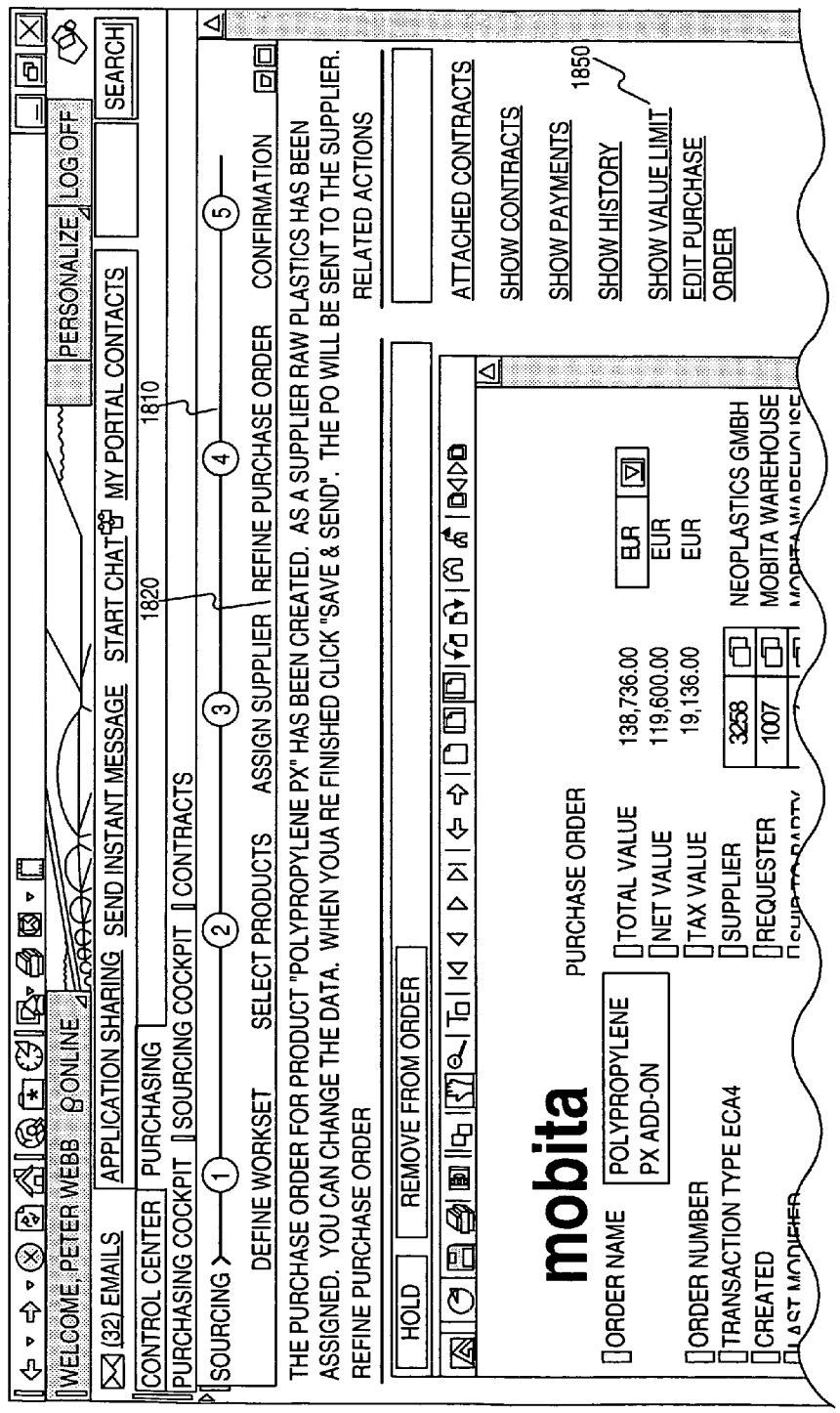
FIG. 18 illustrates an example of step four of a five-step sourcing guided activity window.
Figure 18:
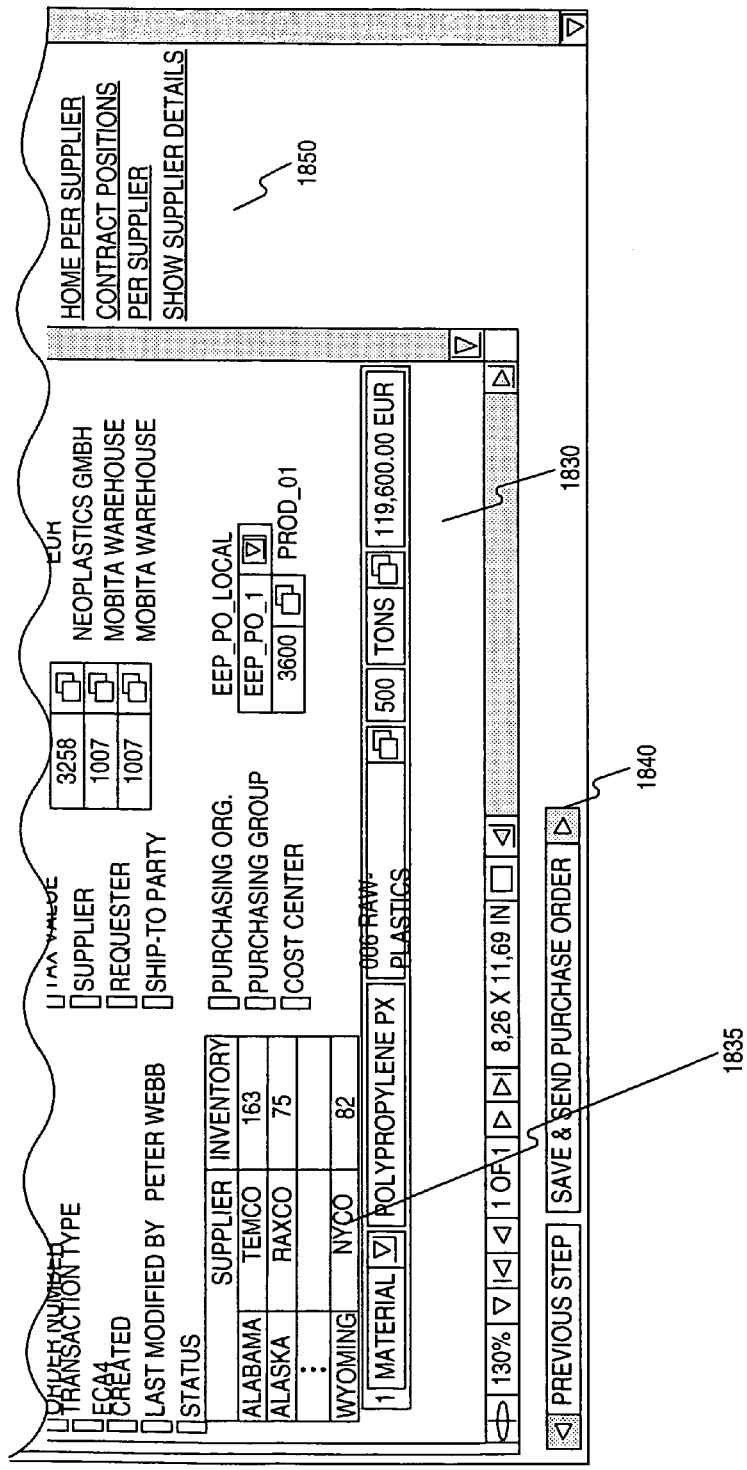

FIG. 18 illustrates an example of step four of a five-step sourcing guided activity window 1400. The user interface may present the user with active roadmap 1810 showing the user that he is in step four, "Refine Purchase Order," of the guided activity window. Text 1820 may instruct the user to review and optionally edit an Adobe Acrobat PDF file of the actual purchase order that is generated and will be sent to the supplier. Work pane 1830 may display the purchase order. Users provided with the actual document that will be generated may typically feel greater comfort with the system. Work pane 1830 may also contain a quick-view report 1835 displaying a summary of the inventory of the requested products at each of the company's locations throughout the United States. In addition, the previous suppliers for each state may also be displayed in the quick-view report 1835. This may enable the user to examine a quick summary of the suppliers without having to examine a full report containing a listing of information that would not be relevant for the current task The core functions 1840 of "Previous Step" and "Save and Send Purchase Order" may be available to the user. When the user selects "Save and Send Purchase Order," he may be taken to the "Confirmation" step shown in FIG. 19.

Figure 19:
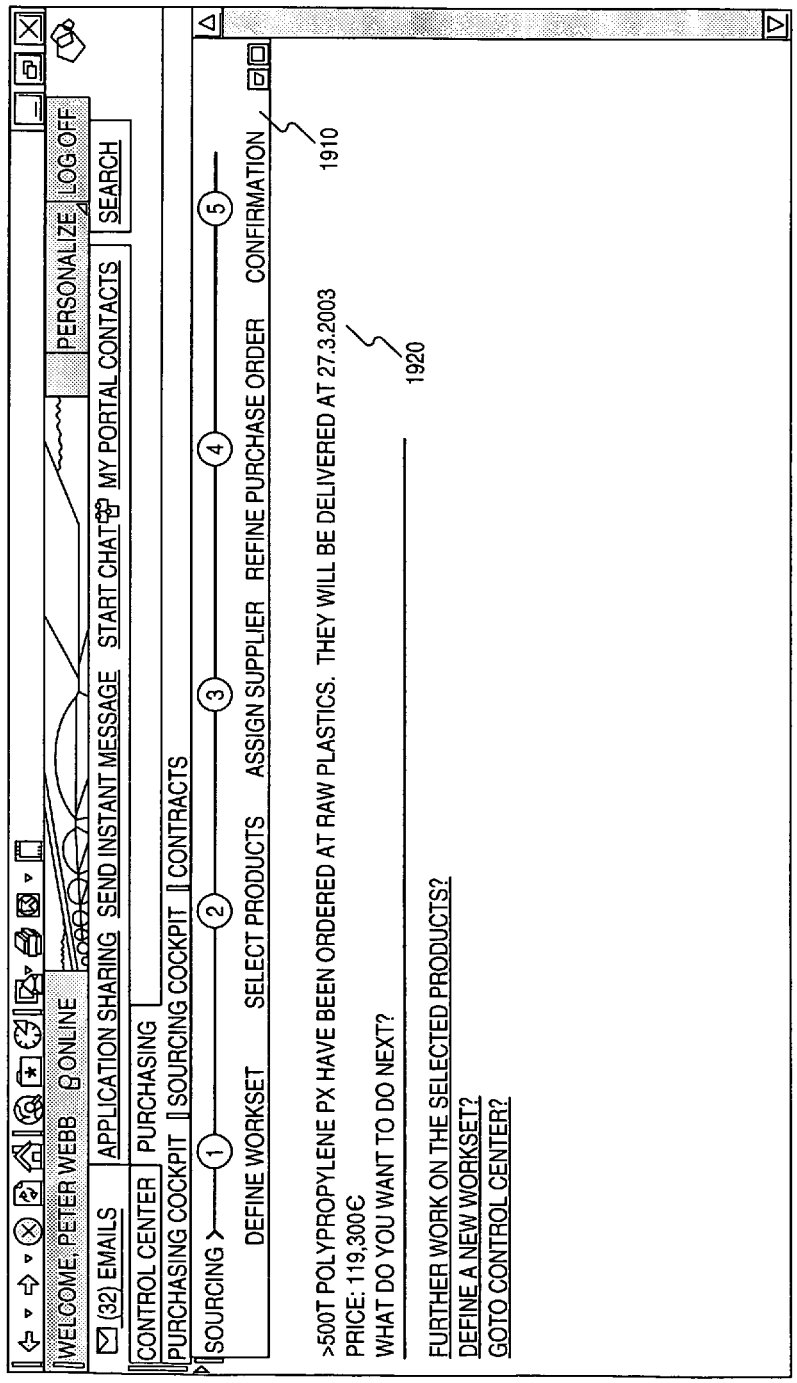
FIG. 19 illustrates an example of step five of a five-step sourcing guided activity window.

Confirmation of functions may often be useful in providing feedback that the desired task or action has been completed. FIG. 19 illustrates an example of step five of a five-step sourcing guided activity window 1400. The user interface may present the user with active roadmap 1910 showing the user that he is in step five, "Confirmation," of the guided activity window. Text 1920 may inform the user that the purchase order has been sent. It is possible that at this step a quick-view report may not be displayed, since the order is complete.

As previously mentioned, the ability of the user to make changes to the user interface need not be limited to the guided activity window. All user interface features of the present invention may permit user adaptability. For example, a user could decide to show a single work pane in a window or multiple work panes in a window. A window may be displayed having a single pane, with functional links permitting the user to display additional panes. Or, multiple panes may initially be displayed and, as panes are closed by the user, the panes may be displayed as functional links. The user may be free to choose her own style of working within the user interface, ranging from complex to simple displays.

As a user changes the user interface, certain previously displayed functions may no longer be relevant and the system need not continue to display those functions to the user. For example, in a multiple pane display, the user interface may display an option relating to both windows, e.g., moving an item from a first pane to a second pane. This function may no longer be necessary when the user changed the display to a single pane display, so this function would be removed from the user interface. Similarly, adding a second pane to a window that initially only displayed a single pane may cause the user interface to display additional functions relevant to a two window display, e.g., the previously mentioned moving an item function. In summary, screen elements may change based on the user's modification of the user interface.

Figure 20:
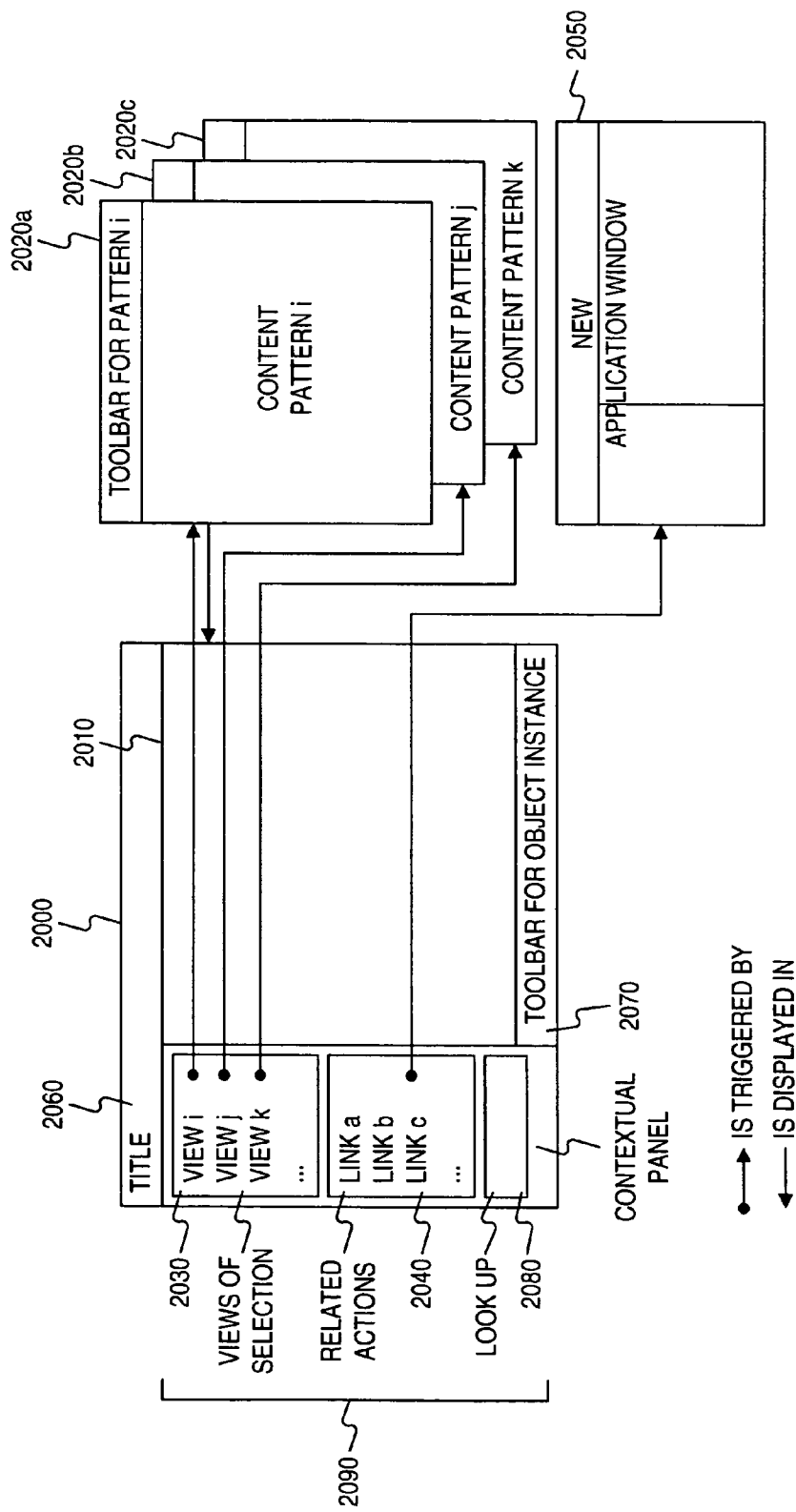
FIG. 20 is an exemplary non-guided object instance floorplan.

FIG. 20 is an exemplary non-guided object instance floorplan 2000. Within a content area 2010, one or more content patterns 2020a-c may appear. The content patterns 2020a-c may appear based on the selection in viewset selection area 2030. For example, if a user selected View j in viewset selection area 2030, the system may display content pattern j 2020b in content pattern area 2010. The viewset selection area may allow navigation to generic and application specific content patterns. In addition, a related action area 2040 may also be present in floorplan 2000. Related action area 2040 may contain one or more links to other applications 2050, e.g., a quick activity window. Related action area 2040 may allow access to activities directly related to the current task or content pattern, but are not the primary focus of the task. Lookup area 2080 may also be present in object instance floorplan 2000 containing links to context related information, e.g., viewing and maintaining related objects or documents, or searching for related objects or documents. Viewset selection area 2030, related action area 2040, and lookup area 2080 may comprise a contextual navigation pattern 2090.

Object instance floorplan 2000 may also contain a title area 2060 for displaying a title of object instance floorplan 2000, and a toolbar area 2070 for displaying tools for manipulating data objects displayed in the one or more content patterns 2020a-c.

Figure 21:
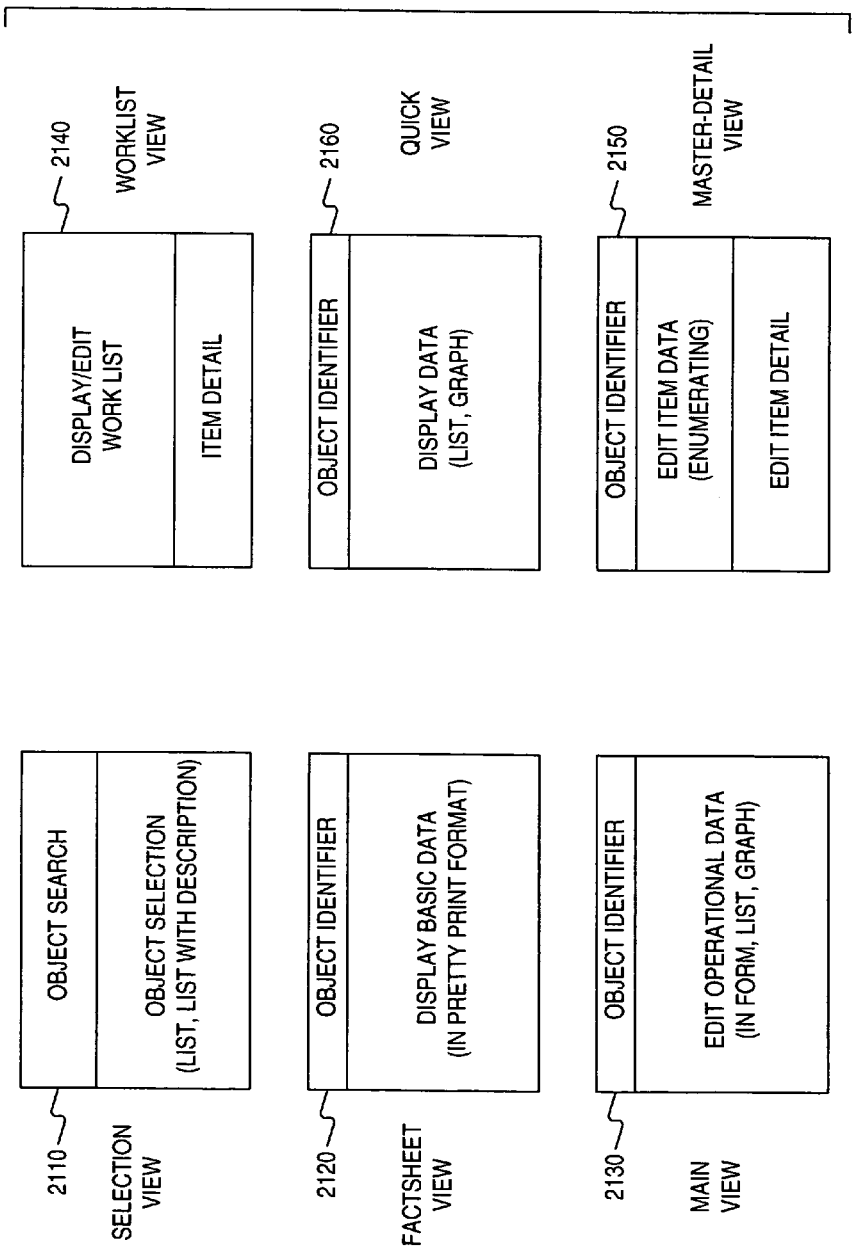
FIG. 21 illustrates a plurality of exemplary content patterns that may be used in the object instance floorplan.

FIG. 21 illustrates a plurality of exemplary content patterns that may be used in the object instance floorplan 2000. As previously described, one or more content patterns may be placed within content area 2010, with the content pattern selected based on the user's choice in the viewset selection area. A selection view content pattern 2110 may display the result of a search for a data object, displaying one or more of the data object search and an object selection portion. The object selection portion may be a list of data objects that meet the search criteria with a description. A factsheet view content pattern 2120 may display an identifier of the data object with one or more elements of the data object displayed in the content pattern 2120. A main view content pattern 2130 may display an identifier of the data object and operational data, for example, in form, list, or graphical display, of the data object. A worklist view content pattern 2140 may display one or more data objects in a work list for either display or editing. A master-detail view content pattern 2150 may display an identifier of the data object and item editing data of the data object. The above are exemplary content pattern, and those skilled in the art will appreciate that other content patterns can be developed. A quick-view report content pattern 2160 may display an identifier of the data object with one or more elements of the data object displayed in the content pattern.

Figure 22B:
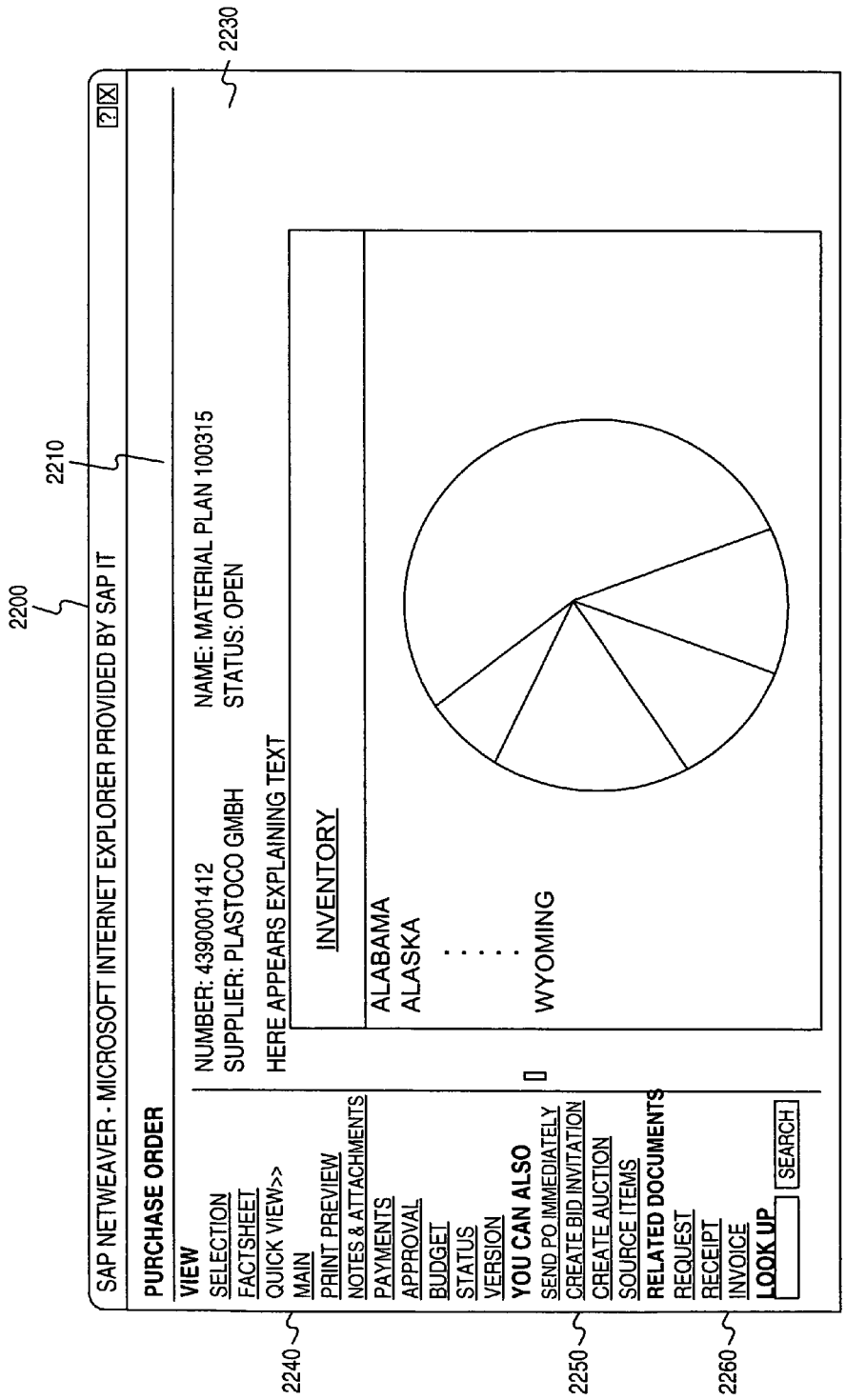
FIG. 22 illustrates an exemplary object instance floorplan.

FIG. 22 illustrates an exemplary object instance floorplan 2200 with two exemplary content patterns 2220, 2230 displayed in content area 2510. As illustrated in the first view, a factsheet content pattern 2220 may be displayed in content area 2210 because the system has responded to the user selecting "Factsheet" in viewset selection area 2240. In the second view, a quick-view report pattern 2230 may be displayed in content area 2210 because the system has responded to the user selecting "Quick View" in viewset selection area 2240.

Those skilled in the art will appreciate that other user modifications can be made to the quick activity window, activity scout, and guided activity window of the present invention.

Those skilled in the art will appreciate that all or part of systems and methods may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom objectoriented code written in the C++ programming language, or using applets written in the Java programming language.

Figure 23:
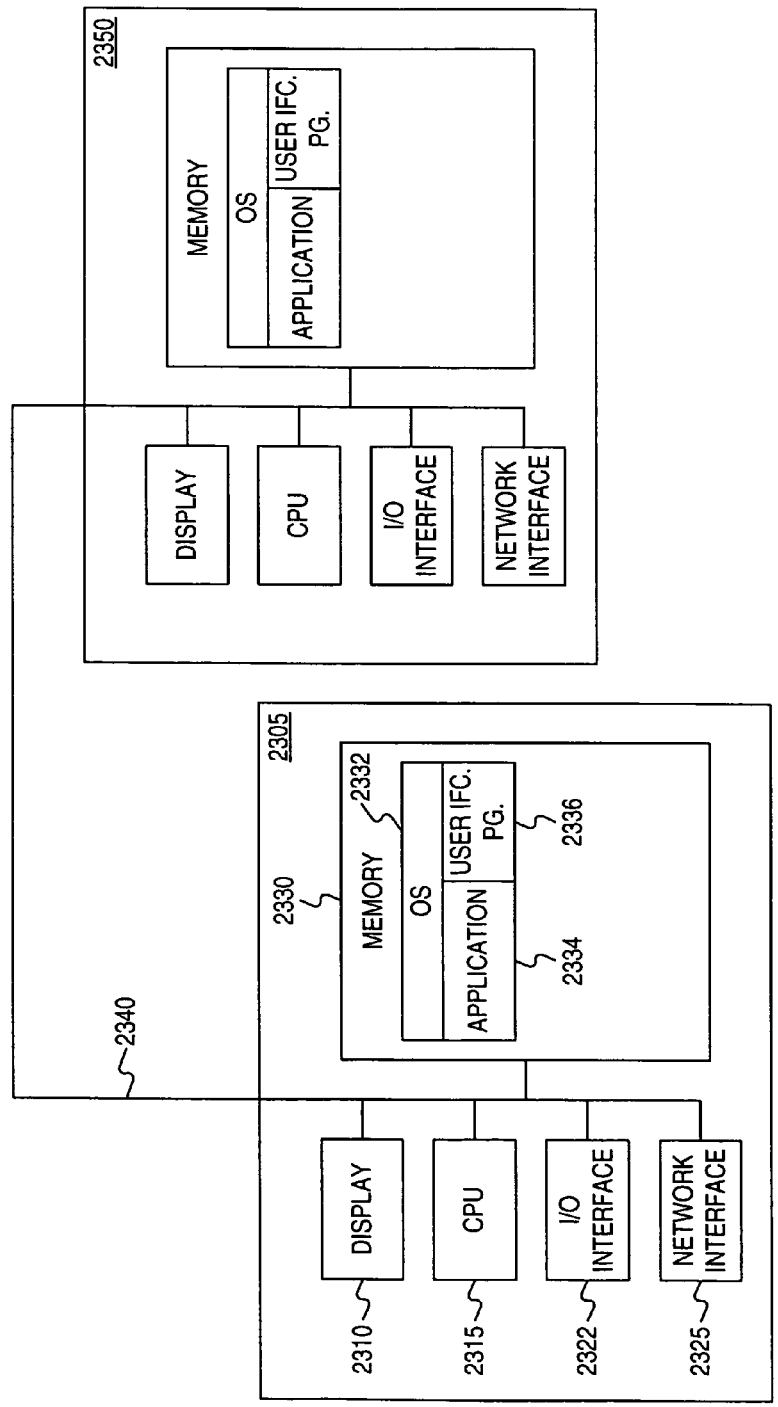
FIG. 23 is a block diagram of components of an exemplary client system and server system.

The user interface described above may operate on a client system 2305 or a server system 2350, or a combination of the two. FIG. 23 is a block diagram of components of an exemplary client system 2305 and server system 2350. Client 2305 may be a general-purpose computer, personal digital assistant, terminal, or workstation or a specially constructed computing platform for carrying-out the user interface operations previously described. Client 2305, having CPU 2315, may provide the user interface to the user and associated communications with necessary databases, structured data, unstructured data, and metadata via I/O interface 2322 (which can be any conventional I/O device) or network interface 2325 (which can be any conventional interface) by direct connections or other communication links. Client 2305 may also provide a local or remote display 2310.

Alternatively, client 2305 can be part of a network such as a telephone-based network (such as a PBX or POTS), a local pane network (LAN), a wide pane network (WAN), a dedicated intranet, and/or the Internet. In this way, client 2305 may be located near or far from any necessary documents or databases.

Memory device 2330 may be implemented with various forms of memory or storage devices, such as read-only memory, random access memory, or external devices. Typically, memory device 2330 stores instructions forming an operating system 2332; one or more application modules 2334 for providing database and user application functions; and a user interface module 2336 for providing the user interface to the user, including the alerts and notifications, flyouts, quick activity windows, activity scouts, and guided activity windows.

Operating system 2332 may be, for example, Windows Longhorn, Windows XP, Apple's OS X, Linux, or Unix. User interface module 2336 may be designed to work in concert with the one or more application modules 2334. With such a design, the user interface module 2336 does not need to be redesigned or duplicated to work in each application module 2335. Such a design enables a common "look and feel" to be present across multiple applications.

As previously mentioned, FIG. 23 also illustrates server 2350. Client 2305 may access server 2350 to run applications residing on server 2350. Client 2305 may do so through connection 2340. Connection 2340 may be, for example, a Wide Area Network, a Local Area Network, or the Internet. Server 2350 operates comparably to the above description of client 2305. The user interface features of the present invention may be found on either client 2305 or server 2350, or a combination of the two devices.

The foregoing description of possible implementations consistent with the present invention does not represent a comprehensive list of all such implementations or all variations of the implementations described. The description of only some implementation should not be construed as an intention to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

The invention claimed is:

1. A computer screen for displaying a quick-view user interface having a window on the computer screen of a first user, comprising:

a pane within the window for displaying, based on a role of the first user, a subset of data drawn from a set of data, wherein the subset of data is imported into the user interface from an external file format and the pane automatically appears within the window to display the subset of data when the subset of data is determined to be relevant to a task the first user is presented with;

a first menu item within the window for allowing the first user to customize layout of the set of data;

a second menu item within the window for allowing the first user to modify value of the subset of data by performing calculation on the subset of data; and a third menu item within the window configured to send the customized layout and the modified subset of data via email for view by a second user, wherein the quick-view user interface is in data communication with an email server.

2. The computer screen of claim 1, further comprising a link to a full-view user interface.

3. The computer screen of claim 1, wherein the subset of data displayed in the pane is in the form of a chart.

4. The computer screen of claim 1, wherein the subset of data displayed in the pane is in the form of a graph.

5. The computer screen of claim 1, wherein the set of data is displayed in a full-view user interface.

6. The computer screen of claim 1, wherein the pane further comprises a content form, wherein the content form is pre-filled upon display of the content form and prior to the user entering any data into the content form.

7. A computer screen for displaying a full-view user interface having a window on the computer screen of a first user, comprising:

a pane within the window for displaying a set of data;

a first link within the window engageable to open a second pane for displaying a first subset of the set of data, the first subset selected based on a role of the first user, wherein the subset of data is imported into the user interface from an external file format;

a first menu item within the window for allowing the first user to customize layout of the set of data;

a second menu item within the window for allowing the first user to modify value of the subset of data by performing calculation on the subset of data; and a third menu item within the window configured to send the customized layout and the modified subset of data via email for view by a second user, wherein the full-view user interface is in data communication with an email server;

wherein the second pane automatically appears within the window to display the subset of the set of data when the subset of data is determined to be relevant to a task the first user is presented with.

8. The computer screen of claim 7, further comprising a second link to a second subset of the set of data.

9. The computer screen of claim 7, further comprising one or more tools to manipulate the set of data contained in the full-view user interface.

10. The computer screen of claim 7, wherein the second pane is located within the window.

11. The computer screen of claim 7, wherein the second pane is located outside the window.

12. A method of providing a quick-view user interface, comprising:

providing a window having a pane to a first user;

selecting a subset from a set of data based on a role of the first user;

displaying the subset of the set of data in the pane, wherein the subset of data is imported into the user interface from an external file format and the pane automatically appears to display the subset of data when the subset of data is determined to be relevant to a task the first user is presented with;

allowing the first user to customize layout of the set of data;

allowing the first user to modify value of the subset of data by performing calculation on the subset of data; and allowing the first user to send the customized layout and the modified subset of data via email for view by a second user, wherein the quick-view user interface is in data communication with an email server.

13. The method of claim 12, further comprising displaying a link to a full-view user interface displaying the set of data.

14. The method of claim 12, wherein the subset of data displayed in the pane is in the form of a chart.

15. The method of claim 12, wherein the subset of data displayed in the pane is in the form of a graph.

16. The method of claim 12, further comprising displaying a content form in the pane, wherein the content form is pre-filled upon display of the content form and prior to the user entering any data into the content form.

17. A method of providing a full-view user interface, comprising:

providing a window to a first user;

displaying a first pane showing a set of data in the window;

displaying a first link engageable to open a second pane for displaying a subset of the set of data, the subset selected based on a role of the first user, wherein the subset of data is imported into the user interface from an external file format and the second pane automatically appears in the window to display the subset of data when the subset of data is determined to be relevant to a task the first user is presented with;

allowing the first user to customize layout of the set of data;

allowing the first user to modify value of the subset of data by performing calculation on the subset of data; and allowing the first user to send the customized layout and the modified subset of data via email for view by a second user, wherein the full-view user interface is in data communication with an email server.

18. The method of claim 17, further comprising a second link to a second quick-view interface.

19. A computer-readable physical medium other than a carrier wave comprising instructions written thereon, the execution of which causes a computer to provide:

a window on a computer screen of a first user;

a pane within the window for displaying, based on a role of the first user, a subset of data drawn from a set of data, wherein the subset of data is imported into the user interface from an external file format and the pane automatically appears within the window to display the subset of data when the subset of data is determined to be relevant to a task the first user is presented with;

a first menu item within the window for allowing the first user to customize layout of the set of data;

a second menu item within the window for allowing the first user to modify value of the subset of data by performing calculation on the subset of data; and a third menu item within the window configured to send the customized layout and the modified subset of data via email for view by a second user, wherein the window is in data communication with an email server.

20. A computer-readable physical medium other than a carrier wave comprising instructions written thereon, the execution of which causes a computer to provide:

a window on a computer screen of a first user;

a pane within the window for displaying a set of data;

a first link within the window engageable to open a second pane for displaying a subset of the set of data, the subset selected based on a role of the first user, wherein the subset of data is imported into the user interface from an external file format and the second pane automatically appears within the window to display the subset of data when the subset of data is determined to be relevant to a task the first user is presented with;

a first menu item within the window for allowing the first user to customize layout of the set of data;

a second menu item within the window for allowing the first user to modify value of the subset of data by performing calculation on the subset of data; and a third menu item within the window configured to send the customized layout and the modified subset of data via email for view by a second user, wherein the window is in data communication with an email server.

* * * * *